United States Patent [19]

Bhadra

[11] Patent Number: 4,774,440

[45] Date of Patent: Sep. 27, 1988

[54] VARIABLE SPEED, VARIABLE MOTION, ELECTRICALLY OPERATED VIBRATOR FOR SCREENING MACHINERY

[75] Inventor: Krishna Bhadra, Brecksville, Ohio

[73] Assignee: Combustion Engineering, Inc., Windsor, Conn.

[21] Appl. No.: 115,066

[22] Filed: Oct. 28, 1987

Related U.S. Application Data

[62] Division of Ser. No. 677,109, Nov. 30, 1984, Pat. No. 4,728,837.

[51] Int. Cl.⁴ .......................................... H02K 7/075
[52] U.S. Cl. ......................................... 310/81; 74/87; 366/127
[58] Field of Search .................. 310/80, 81, 82, 261; 74/87; 366/108, 127, 128

[56] References Cited

U.S. PATENT DOCUMENTS

| 4,382,199 | 5/1983 | Isaacson | 310/90 |
| 4,632,751 | 12/1986 | Johnson et al. | 74/87 |
| 4,728,837 | 3/1988 | Bhadra | 310/81 |

FOREIGN PATENT DOCUMENTS

| 230057 | 12/1958 | Australia | 310/81 |
| 1054124 | 2/1954 | France | 310/81 |

Primary Examiner—Patrick R. Salce
Assistant Examiner—D. L. Rebsch
Attorney, Agent, or Firm—William W. Habelt

[57] ABSTRACT

A vibration generator (50) with a magnetically attractable mass (98) is loosely disposed within a substantially cylindrical cavity of a housing (54). An array of electromagnets (60-90) is circumferentially spaced around the housing cavity. The electromagnets (60-90) are sequentially energized in a predetermined sequence to magnetically attract the loosely disposed mass (98) toward an energized electromagnet, thereby causing the magnetically attractable mass (98) to orbit around the array of electromagnets, imparting centrifugal force to the housing (54) which in turn generates vibration energy.

19 Claims, 25 Drawing Sheets

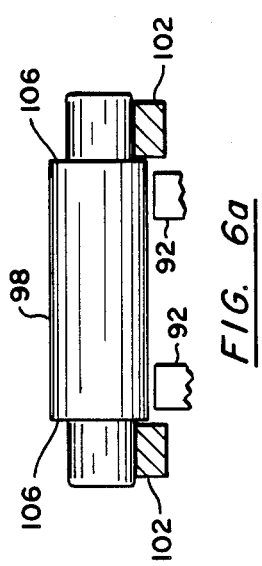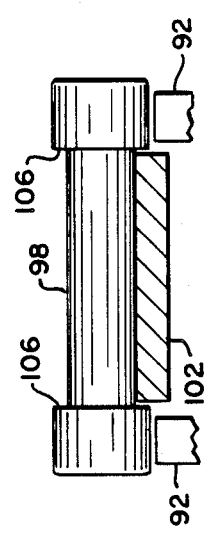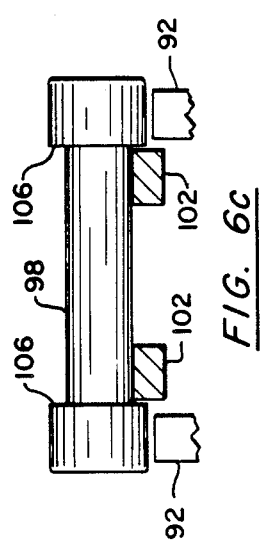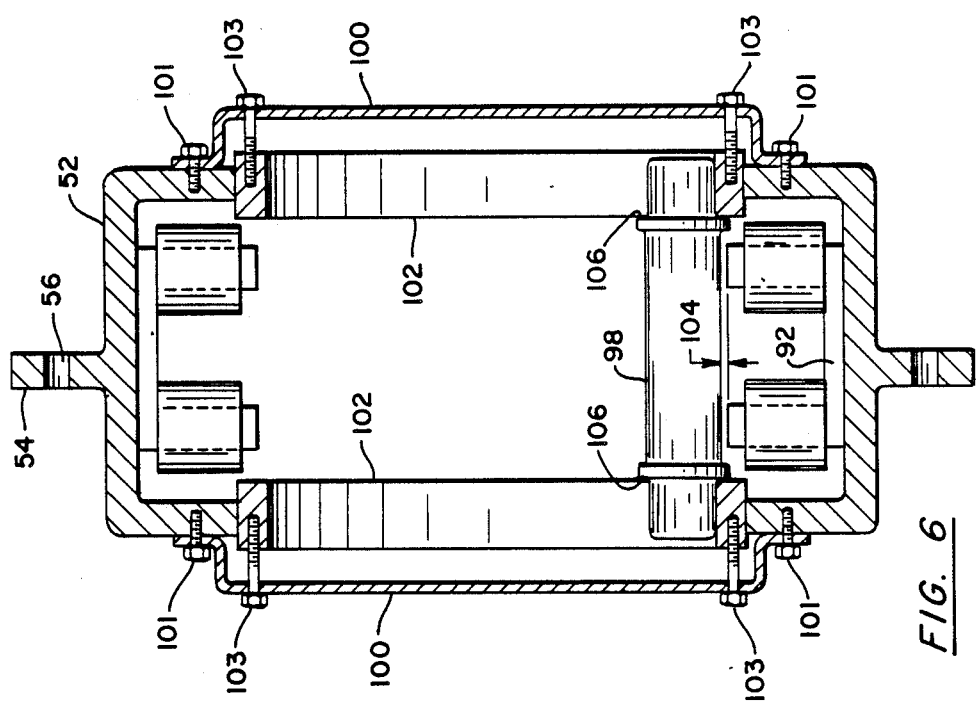

VARIABLE SPEED, VARIABLE MOTION, ELECTRICALLY OPERATED VIBRATOR FOR SCREENING MACHINERY

This a division of application Ser. No. 677,109, filed Nov. 30, 1984, now U.S. Pat. No. 4,728,837.

BACKGROUND OF THE INVENTION

This invention relates to a method and apparatus for generating vibration energy useful in a vibrating process such as vibratory screens and in particular to a method and apparatus for generating vibration energy by magnetically orbiting a loosely disposed mass within an apparent rotating magnetic field.

Vibration energy for use in processes has previously been generated by placing one or more imbalanced masses on a shaft and driving the shaft with an external power source. As the shaft on which the imbalanced mass is mounted is rotated, a radially outward centrifugal force coincident with the axis of the shaft and the center of gravity of the imbalanced mass is generated. This design of vibration generator loads the shaft bearings, resulting in wear and a short useful life.

Heretofore, vibration energy has been generated by rotating a shaft having thereon one or more eccentric weights. The centrifugal force thereby generated was transmitted to the device on which the shaft was mounted through the shaft and shaft bearings. As a result the shaft bearings carried the centrifugal load, resulting in rapid bearing wear.

U.S. Pat. No. 2,945,386 addressed this problem. In FIGS. 1-3 an arrangement is disclosed wherein a balanced spool-shaped weight is rotated by an external source. An annular guideway in the spool-shaped weight provides a guideway for passage of a magnetically attractable ball. Permanent magnets are embedded in and rotate with the spool-shaped weight. The magnets are spaced evenly around the axis of the spool-shaped weight and are placed on both sides of the annular passageway so as to attract the magnetic ball therebetween. As the spool-shaped weight is rotated the magnetically attractable rolling element travels in alignment between aligned magnets on the spool-shaped weight thus providing a centrifugal force as the magnetically attractable rolling element rotates about the axis of the spool-shaped weight.

However, such vibration generators require an external mechanical force to propel the rolling weight about the raceway.

Another known vibration generator that eliminates the bearing load problem is disclosed in U.S. Pat. No. 3,135,124 by providing a cylindrical rotor within a cylindrical raceway in which the cylindrical rotor has reaction passages therein such that fluid flowing through the reaction passages produces a reaction that causes the rotor to rotate and to seek a position against the raceway and roll thereon to produce vibration.

In addition, in applications such as screening where vibration energy on both side plates of the screening apparatus was identical, two eccentric weights, one mounted near each side plate of the screening apparatus and further mounted on the same shaft to assure mechanical synchronization, were rotated. Two additional eccentric weights again were mounted near each side plate, on a second shaft. The four eccentric weights were rotated to generate vibration energy. Shaft deflection due to its own weight on long shafts, resulted in shaft failure and limited shaft lengths, and hence the width of a screening apparatus, to approximately ten feet.

SUMMARY OF THE INVENTION

The present invention provides a method and apparatus for generating vibration energy. In accordance with one embodiment of the invention, a magnetically attractable mass is loosely disposed within a cavity of a housing. A plurality of electromagnets spaced in a circular array having a horizontal axis around the cavity are sequentially energized in a predetermined sequence to magnetically attract the loosely disposed mass towards an energized electromagnet thereby causing the magnetically attractable mass to orbit around the array of electromagnets imparting centrifugal force to the housing which in turn generates vibration energy.

In an alternate embodiment of the invention, a cylindrical housing having a loosely disposed mass therein and a shaft passing coaxially therethrough has an idler arm extending radially outward from the shaft slidably engaging the mass such that when the shaft is rotated by an external power source, the mass is driven circumferentially around the interior of the housing by the idler arm engaging the mass, such that a centrifugal force is exerted on the housing with essentially no load on the shaft due to the centrifugal force generated.

In yet another embodiment of the invention, a housing having a cylindrical cavity with a plurality of electromagnets spaced in a circular array and a shaft passing coaxially therethrough has a magnetically attractable idler arm fixedly mounted on the shaft and extending radially outward therefrom substantially to the electromagnets with clearance therebetween for being magnetically attracted by an energized electromagnet, thereby orbiting about the axis of the shaft as the electromagnets are sequentially energized and deenergized in a predetermined sequence such that a centrifugal force is generated and transmitted to the housing.

The invention further contemplates a method of operating a vibration generator for the purpose of inducing vibration by sequentially energizing and deenergizing in a predetermined sequence each electromagnet of the plurality of electromagnets spaced circumferentially around a horizontal axis, thereby causing an apparent rotating magnetic field which in turn causes the magnetically attractable mass to move circumferentially toward the energized electromagnet in a desired direction of rotation generating a centrifugal force. The desired direction of rotation of the apparent rotating magnetic field is determined by the predetermined sequence of energizing then deenergizing the plurality of electromagnets and can result in either clockwise or counterclockwise orbiting of the loosely disposed mass. The predetermined sequence of energizing then deenergizing the electromagnets is dependent upon, inter alia, the number of electromagnets in the circular array, the form of the loosely disposed mass in the various embodiments, and other physical relationships herein described in more detail.

The invention further contemplates a method of operating a vibration generator of the type having a plurality of electromagnets spaced circumferentially around a horizontal axis and a loosely disposed mass initially resting within the circumferentially spaced magnets at the point of lowest potential energy of energizing an electromagnet on a first side of an imaginary plane passing substantially through the axis of the circumferentially spaced electromagnets and the point of lowest potential energy of the loosely disposed mass. The loosely disposed mass is attracted to the first side of the imaginary plane thereby imparting motion and potential energy to the loosely disposed mass. The energized electromagnet on the first side of the imaginary plane is deenergized, thereby permitting the loosely disposed mass to reverse direction to return to the point of lowest potential energy and beyond to a second side of the imaginary plane where an electromagnet on the second side of the imaginary plane is energized to increase the potential energy of the loosely disposed mass on the second side of the imaginary plane. If sufficient potential energy is thereby imparted to the loosely disposed mass, the plurality of electromagnets are sequentially energized in a predetermined sequence to sustain orbiting of the loosely disposed mass. If sufficient potential energy has not been imparted to the loosely disposed mass to complete the first orbit, the energized electromagnet on the second side of the imaginary plane is deenergized and the above-described steps repeated until sufficient potential energy has been imparted to the loosely disposed mass to sustain orbiting. This method of operating a vibration generator results in a pendulum-type startup.

The invention further contemplates a method of operating two vibration generators having a synchronized or common control system for sequentially energizing and deenergizing in a predetermined sequence each electromagnet of a circumferentially arranged array of electromagnets, thereby establishing apparent rotating magnetic fields in the two vibration generators having a phase relationship therebetween and resulting in a net centrifugal force that is utilized as vibration energy in a process.

The invention further contemplates a method of operating four vibration generators having synchronized control systems or a common control system. In a preferred embodiment, two of the four vibration generators are operated as a first pair with the rate of orbiting the orbiting mass therein electrically synchronized. The remaining two vibration generators are operated as a second pair with the rate of orbiting of the loosely disposed mass therein also electrically synchronized and further in a desired phase relationship with the synchronized orbiting masses of the first pair.

BRIEF DESCRIPTION OF THE DRAWING

FIG. 6 is an axial cross-section of the vibration generator of FIG. 5;

FIG. 6a illustrates an alternate embodiment of an annular ring and flange;

FIG. 6b another alternate embodiment of an annular ring and flange;

FIG. 6c illustrates yet another alternate embodiment of an annular ring and flange;

DESCRIPTION OF THE PREFERRED EMBODIMENT

Figure 1:
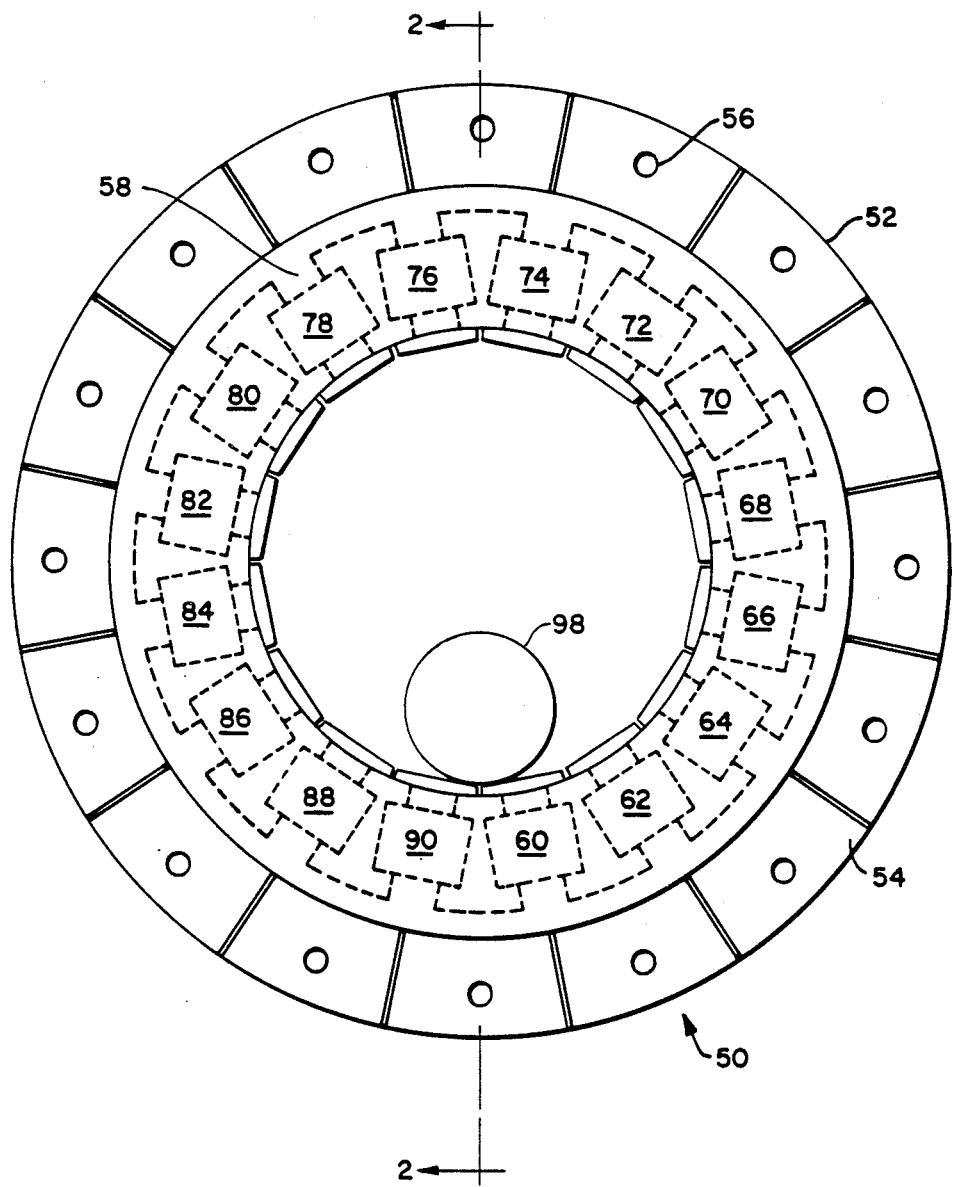
FIG. 1 is a vertical cross-section transverse to the axis of rotation, of a vibration generator designed in accordance with the present invention.

Referring to the drawing, initially to FIG. 1, there is depicted therein a vibration generator designed in accordance with the present invention. Vibrator 50 includes a housing 52 having a cylindrical cavity within. Housing 52 is made of a material of low magnetic permeability and includes a stiffener ring 54 having holes 56 spaced around the perimeter of stiffener ring 54 so that housing 52 may be bolted to the apparatus to be vibrated, such that any vibrational energy generated within housing 52 can be transmitted to the process wherein the vibrational energy is utilized. Within housing 52, spacer 58 maintains electromagnets 60-90 spaced equidistantly around the interior of housing 52, forming a circular array of electromagnets 60-90.

Figure 2:
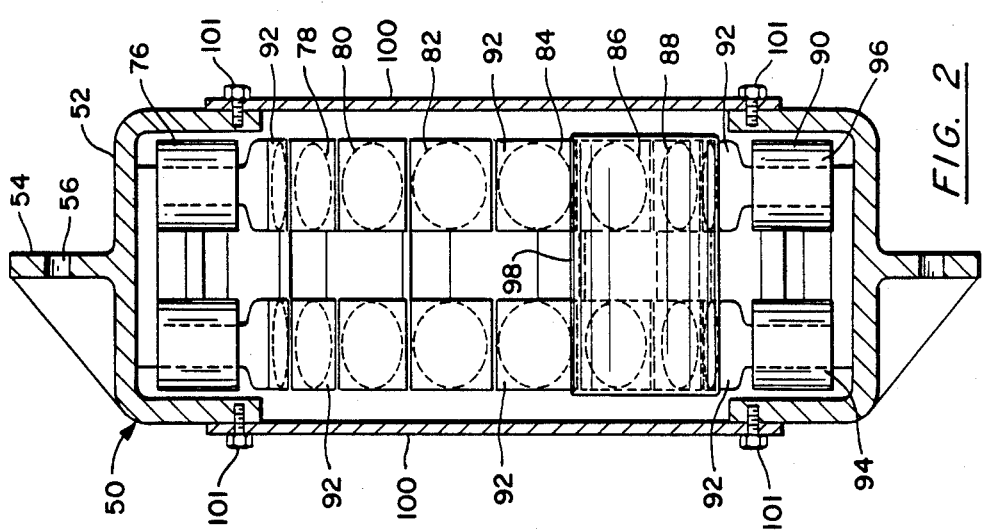
FIG. 2 is an axial cross-section of the vibration generator of FIG. 1.

As best seen in FIG. 2, each electromagnet consists of a high magnetic permeability U-shaped core such as a stack of laminated U-shaped plates with a coil of copper wire or wire of other material that conducts electricity around each of the legs of the U-shaped core. Coils 94 and 96 are wired in series such that when coils 94 and 96 are energized with a direct current, electromagnet 90 is energized, creating a north magnetic pole at the termination of one of the legs of core 92 and a south magnetic pole at the termination of the other leg of core 92. The size of core 92, as well as the number of amp-turns in coils 94 and 96, will vary among vibration generator designs, depending upon the vibration energy generated. Coils 94 and 96 of each of the electromagnets 60-90 are wired out through housing 52 such that electromagnets 60-90 may be energized external to housing 52.

Magnetically attractable mass 98 is loosely disposed within housing 52, and while at rest is at the point of lowest potential energy. Magnetically attractable mass 98 spans the distance between the terminated ends of core 92 and when an electromagnet adjacent to magnetically attractable mass 98 is energized, mass 98 conducts magnetic flux between the north and south poles of the energized magnet. Magnetically attractable mass 98 in one embodiment is substantially cylindrical such that when an electromagnet adjacent to mass 98 is energized and mass 98 is attracted toward the energized electromagnet, mass 98 rolls toward the energized electromagnet. As discussed below, mass 98 in other embodiments will take other forms.

Figure 3:
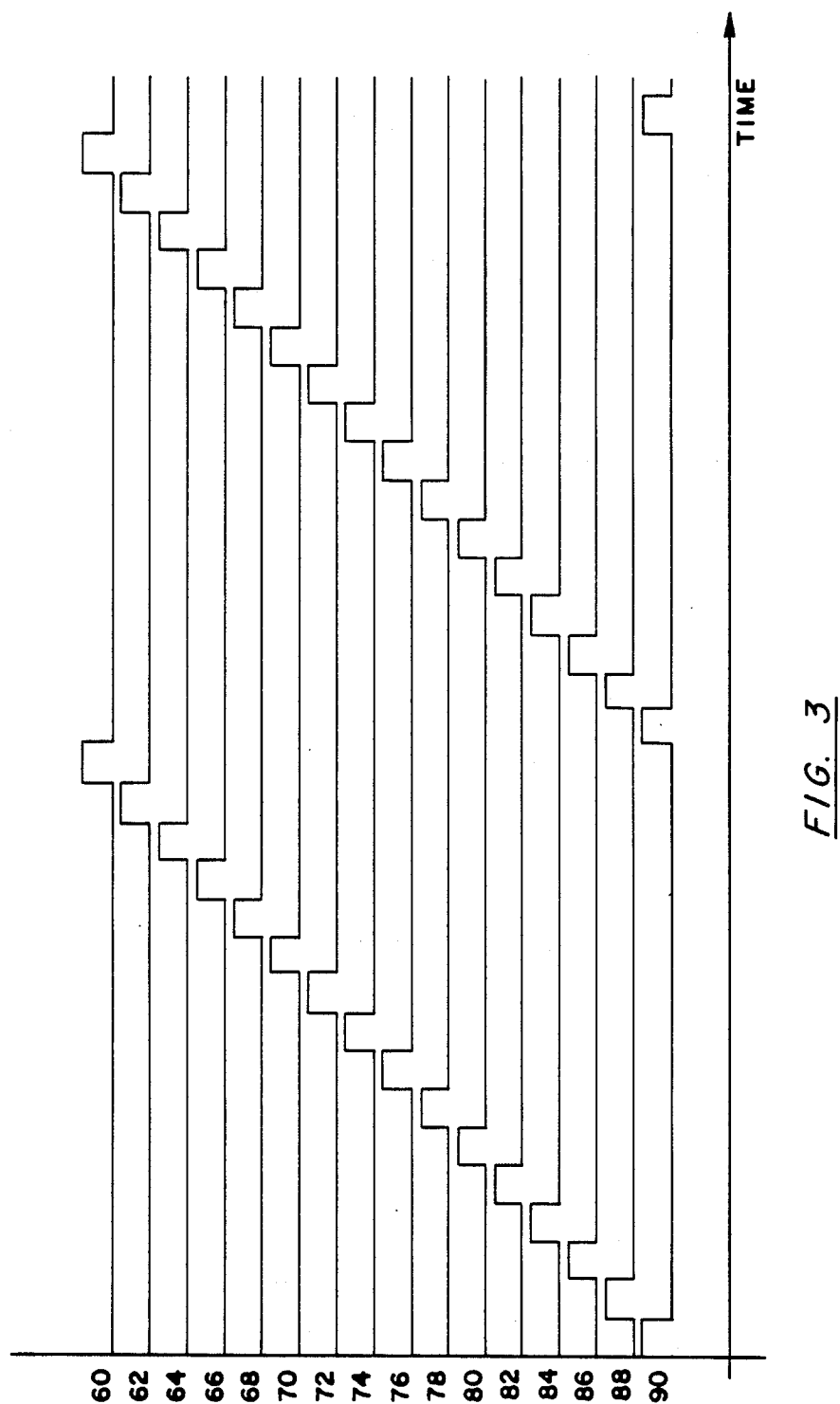
FIG. 3 is a schematic illustration of a timing diagram disclosing a predetermined sequence for energizing then deenergizing each electromagnet of the vibration generator of FIGS. 1 and 2 resulting in clockwise rotation of the magnetic field and orbiting of the loosely disposed mass.

When vibration generator 50 is operated electromagnets 60-90 are sequentially energized and deenergized in a predetermined sequence. As shown in FIG. 3, energizing and deenergizing electromagnets 60-90 in the sequence 90, 88, 86, 84, 82, 80, 78, 76, 74, 72, 70, 68, 66, 64, 62 and 60 repetitively results in an apparent magnetic field rotating clockwise which causes mass 98 to roll on the terminated ends of magnetic core 92 of each of electromagnets 60-90 toward the energized electromagnet such that mass 98 orbits clockwise with respect to the perspective of FIG. 1.

Figure 4:
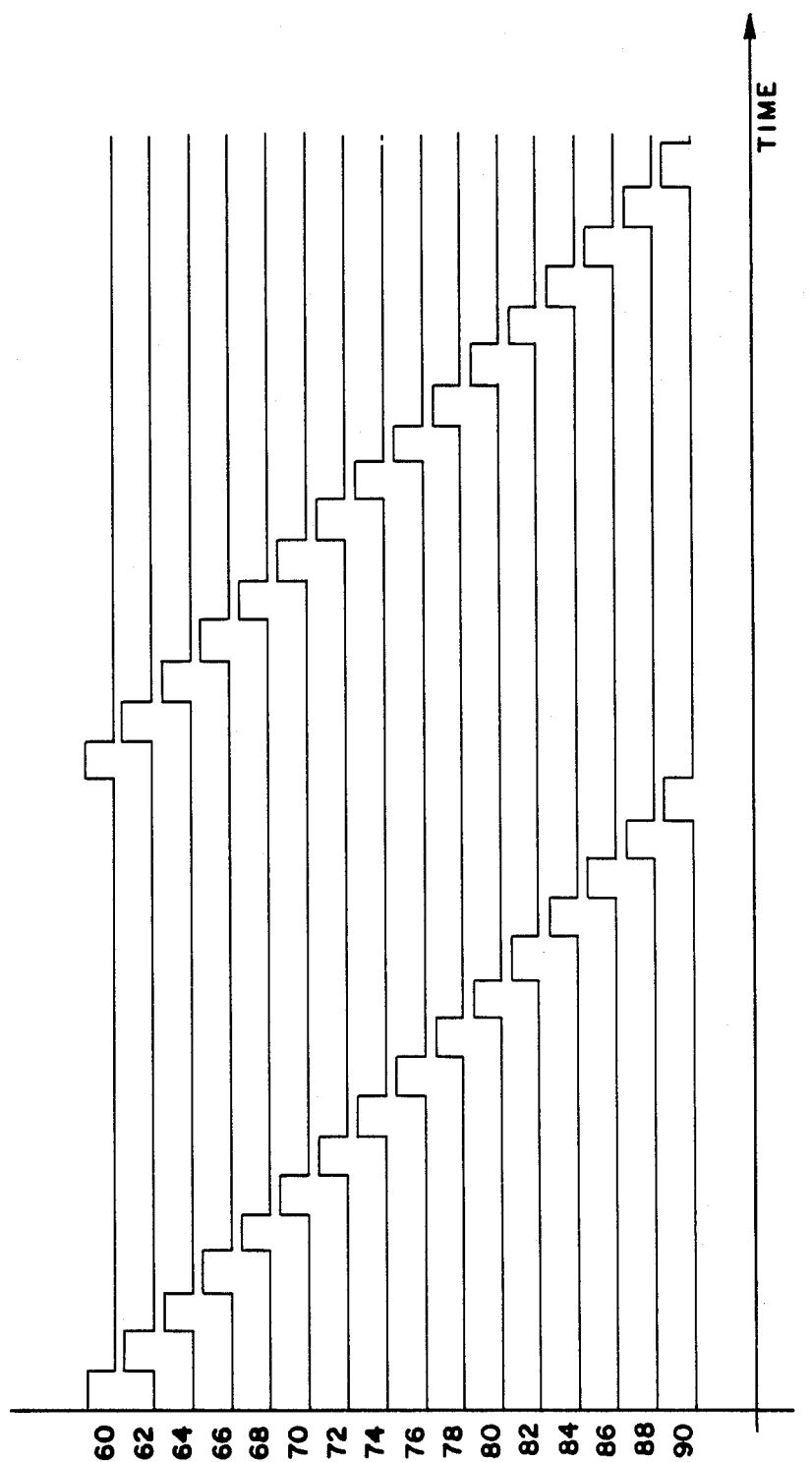
FIG. 4 is a schematic illustration of a timing diagram disclosing a predetermined sequence for energizing then deenergizing each electromagnet of the vibration generator of FIGS. 1 and 2 resulting in counterclockwise rotation of the magnetic field and orbiting of the loosely disPosed mass.

Alternatively, starting initially at rest at the point of lowest potential energy as shown in FIG. 1, energizing and deenergizing electromagnets 60-90 in the sequence 60, 62, 64, 66, 68, 70, 72, 74, 76, 78, 80, 82, 84, 86, 88 and 90 repetitively, as shown in FIG. 4 results in an apparent magnetic field rotating counterclockwise around the array of electromagnets which in turn causes mass 98 to orbit counterclockwise around the circular array of electromagnets. As mass 98 orbits around the array of electromagnets a centrifugal force is generated that is transmitted through core 92, spacer 58, housing 52 and stiffener ring 54, thence to the process where the resulting vibratory energy is utilized. The centrifugal force generated as mass 98 orbits around the array of electromagnets 60-90, increases as the rate of mass 98 orbiting around the array of electromagnets increases. As the centrifugal force increases the frictional force between mass 98 and core 92 also increases. Furthermore, any discontinuity between adjacent magnetic cores contributes to an irregular centrifugal force.

Figure 5:
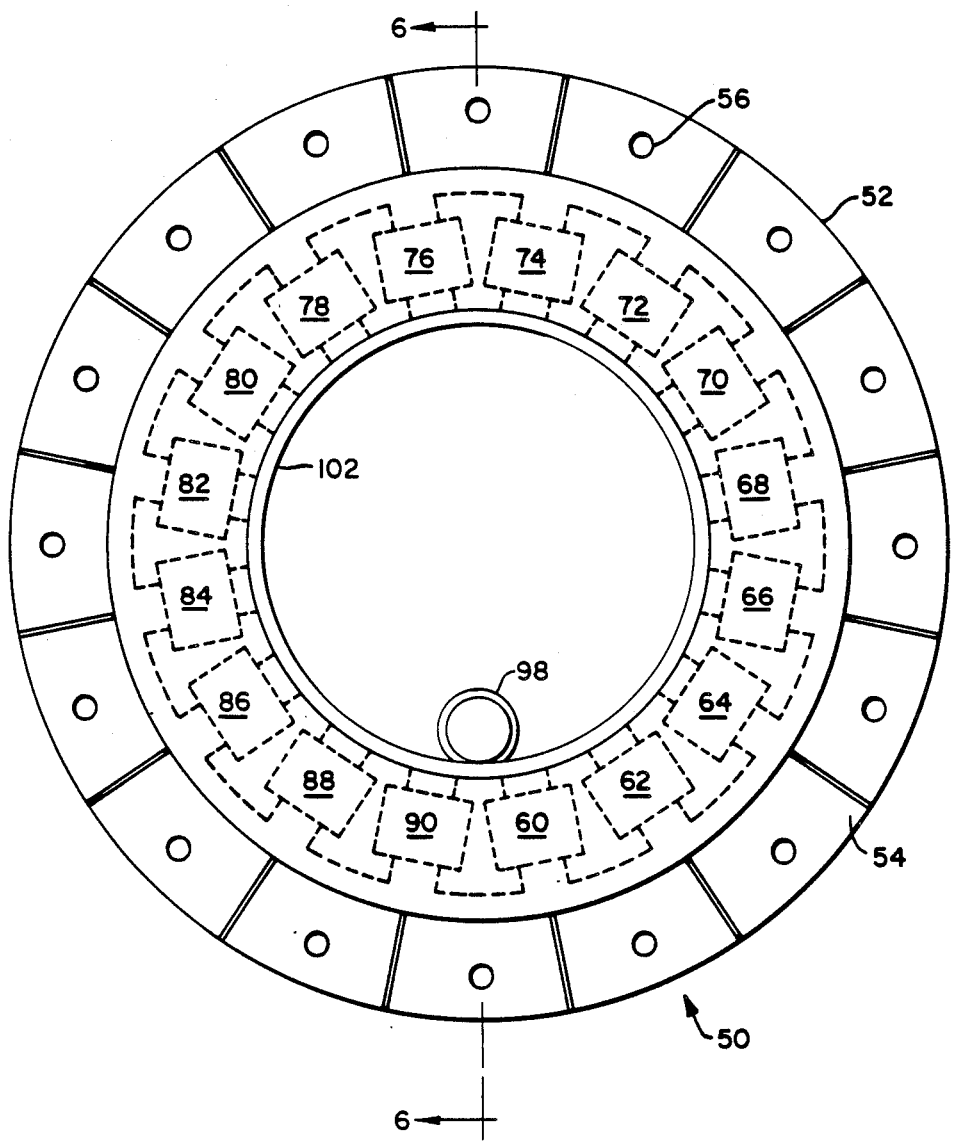
FIG. 5 is a vertical cross-section, transverse to the axis of rotation of an alternate embodiment.

Placing a guideway means annularly around the cavity such that the magnetically attractable mass 98 rolls on the guideway means and clears the electromagnets, obviates the uneven force generated by vibration generator 50 and by choice of material can reduce the frictional force experienced by mass 98. As shown in FIGS. 5 and 6, an annular raceway is disposed within the housing. In the preferred embodiment, the guideway means consists of a pair of spaced annular rings 102 on which mass 98 rolls. Annular rings 102 in the preferred embodiment are within and tightly fitted to the housing cavity and may be secured by bolts 103. Mass 98, although clearing magnetic cores 92 at 104, continues to provide a magnetic flux path between the north and south poles of an energized electromagnet. Annular rings 102 are wide, so as to distribute the centrifugal force acting thereon over a larger area thus reducing wear. Flange 106 prevents mass 98 from moving laterally relative to annular rings 102.

While the annular ring and flange arrangement of the preferred embodiment is shown in FIG. 6, functionally equivalent annular ring and flange arrangements are contemplated within the scope of the invention. A few such arrangements are shown in FIGS. 6a-c. In FIG. 6a the radius of mass 98 is larger between annular rings 102 than the radius of the portion of mass 98 that rolls on the rings 102. The difference between the radii of the two sections provides a flange that engages the inner edge of annular rings 102 preventing mass 98 from moving laterally.

A single annular ring may be employed, to prevent lateral movement of mass 98 as shown in FIG. 6b in the single annular ring arrangement, a smaller radius portion of mass 98 engages and rolls on annular ring 102 with a larger radius portion of mass 98 on each of mass 98 with the difference in radii providing a flange 106 that engages the outer edge of annular ring 102, thereby preventing lateral movement of mass 98. Yet another alternate embodiment is shown in FIG. 6c wherein the single annular ring of FIG. 6b has been replaced with a pair of spaced annular rings; the difference in radii between the smaller and larger radii portions of mass 98 provide a flange to engage the outer edge of annular rings 102, thereby preventing lateral movement of mass 98.

Figure 7:
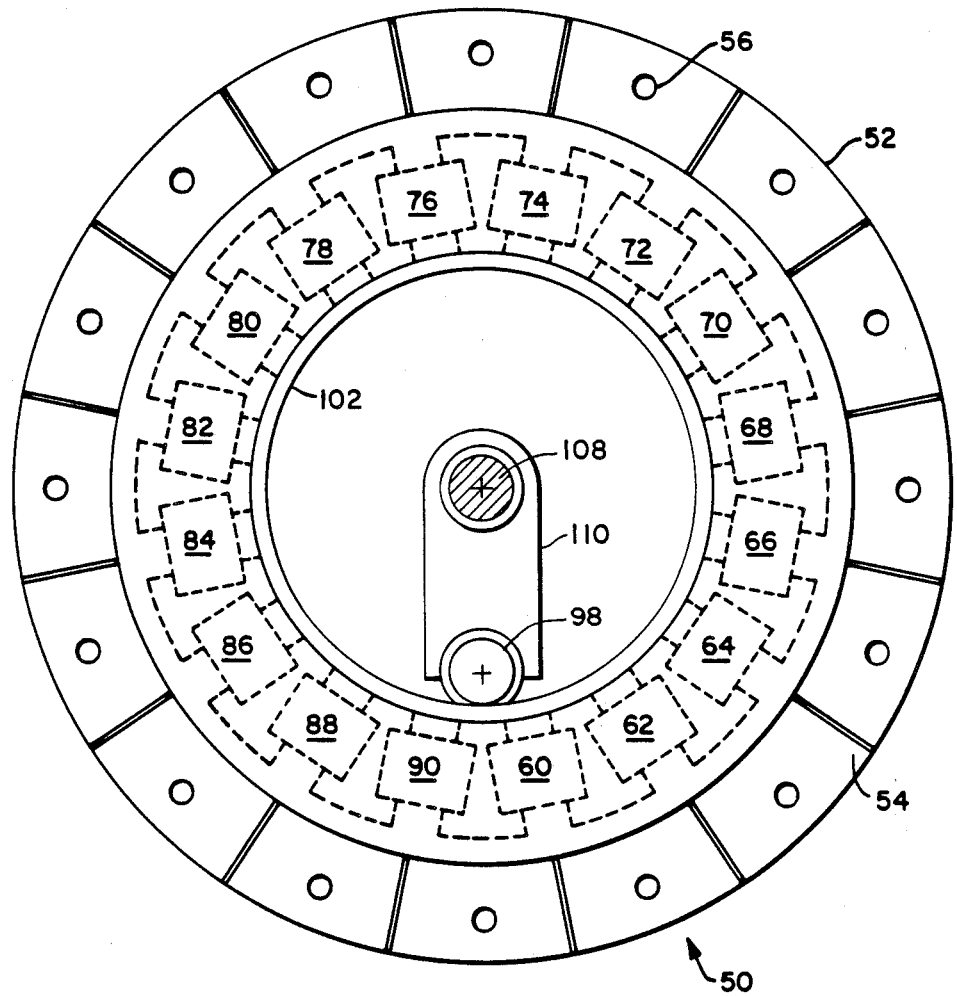
FIG. 7 is a vertical cross-section, transverse to the axis of rotation, of an alternate embodiment including an idler arm and roller carriage.

During startup or shutdown when insufficient energy has been imparted to mass 98 to orbit, mass 98 may depart from a substantially circular path and separate from annular rings 102. To prevent mass 98 from departing from a substantially circular path, shaft 108, as best seen in FIG. 7, is mounted from housing 52 coaxially with the axis of the array of electromagnets 60-90 having an idler arm 110 extending radially therefrom for slidably engaging magnetically attractable mass 98. Idler arm 110 prevents mass 98 from substantially separating from annular rings 102 when insufficient energy has been imparted to mass 98 to orbit.

Figure 8:
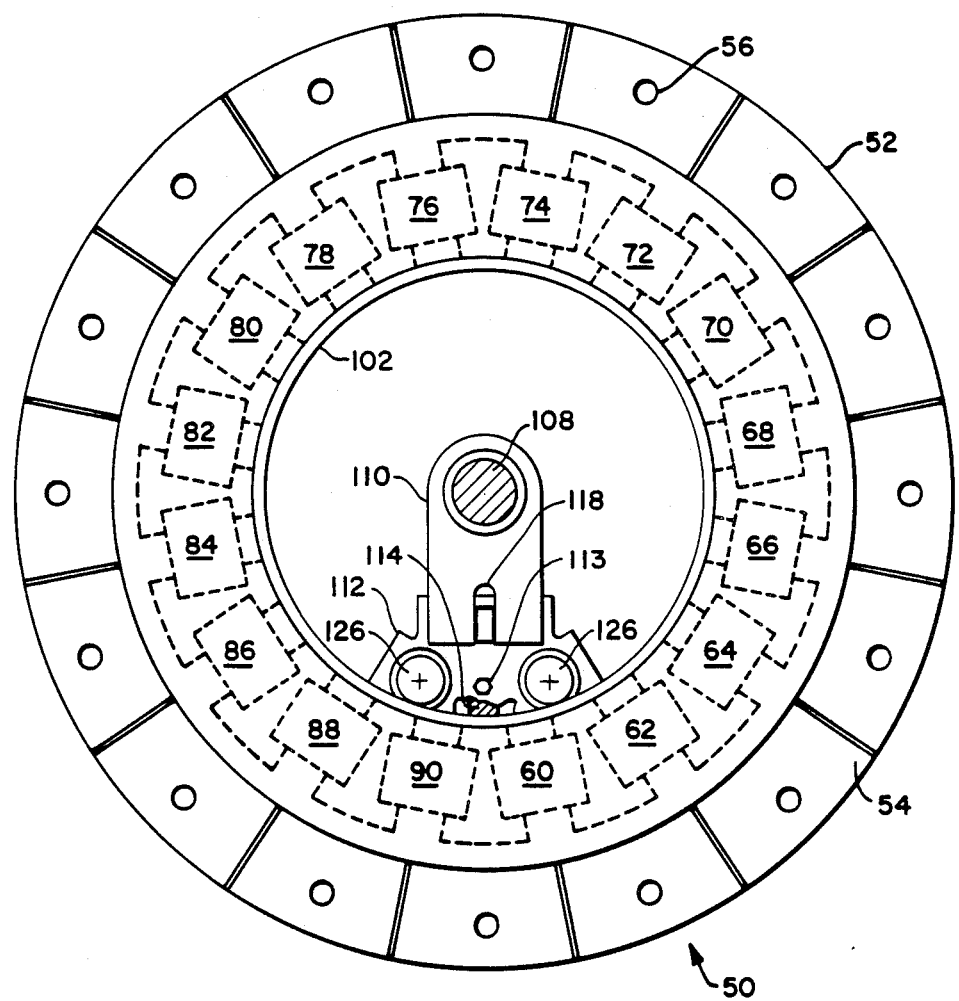
FIG. 8 is a vertical cross-section, transverse to the axis of rotation, of an embodiment including two rollers.

To obtain the desired centrifugal force it is sometimes necessary to employ more than a single rolling mass 98. In the embodiment shown in FIG. 8, orbiting mass 98 includes two rollers 126 that are coupled by roller carriage 112 which is slidably engaged with radial arm 110 to permit radial movement of roller carriage 112. The angle formed between the axis of rollers 126 and the axis of shaft 108 can be virtually any angle. It need not, but may have a relationship with the angle between the centerline of a cross-section of core 92, as shown in FIG. 8, of adjacent electromagnets and the axis of shaft 108. Some specific examples are discussed below with respect to FIGS. 12 and 18. As will be evident following those discussions, the control system can be designed to sequentially energize, then deenergize in a predetermined sequence the plurality of electromagnets 60-90 to accommodate virtually any angle between the centerline of rollers 126 and the axis of shaft 108.

In the preferred embodiment idler arm 110 includes a pair of spaced idler arms fixedly mounted on shaft 108 extending radially outward therefrom substantially to electromagnets 60-90 and engaging orbiting mass 98. As best seen in FIG. 8, when a roller carriage 112 is employed as part of mass 98 between rollers 126 and slidably engaging idler arm 110, rollers 126 can be made of a low magnetic permeability material that provides a low coefficient of friction between the rollers and the raceway, annular rings 102. A separate pole piece 114 of magnetically permeable material is placed between rollers 126 and extend transversely between spaced idler arms 110. Pole piece 114 conducts magnetic flux between the poles of an energized electromagnet and is attracted to the energized electromagnet thereby providing the force to move the entire orbiting mass 98. Pole piece 114 is secured to roller carriage 112 by bolts 113 having an eccentric shank such that the air gap between pole piece 114 and core 92 is adjustable.

To reduce friction between rollers 126 and roller carriage 112 a fricion reducing means 116 is employed. The friction reducing means may consist of a bearing or other antifriction device. A polyurethane separator bearing that provides a wide surface between roller 126 and roller carriage 112 is preferred.

To vary the magnitude of centrifugal force generated, the radius between the center of gravity of the orbiting mass and the axis of orbiting which is coincident with the axis of shaft 108 can be varied. Alternatively, the orbiting mass may be made larger or smaller, to obtain a centrifugal force of appropriate magnitude. The present invention contemplates interchangeable masses 98 such that to increase the centrifugal force a larger mass 98 may replace the existing mass 98 and correspondingly to obtain a smaller centrifugal force a smaller mass 98 may replace the existing mass 98. This is most readily achieved by interchangeable rollers 126 of different weights.

Figure 9:
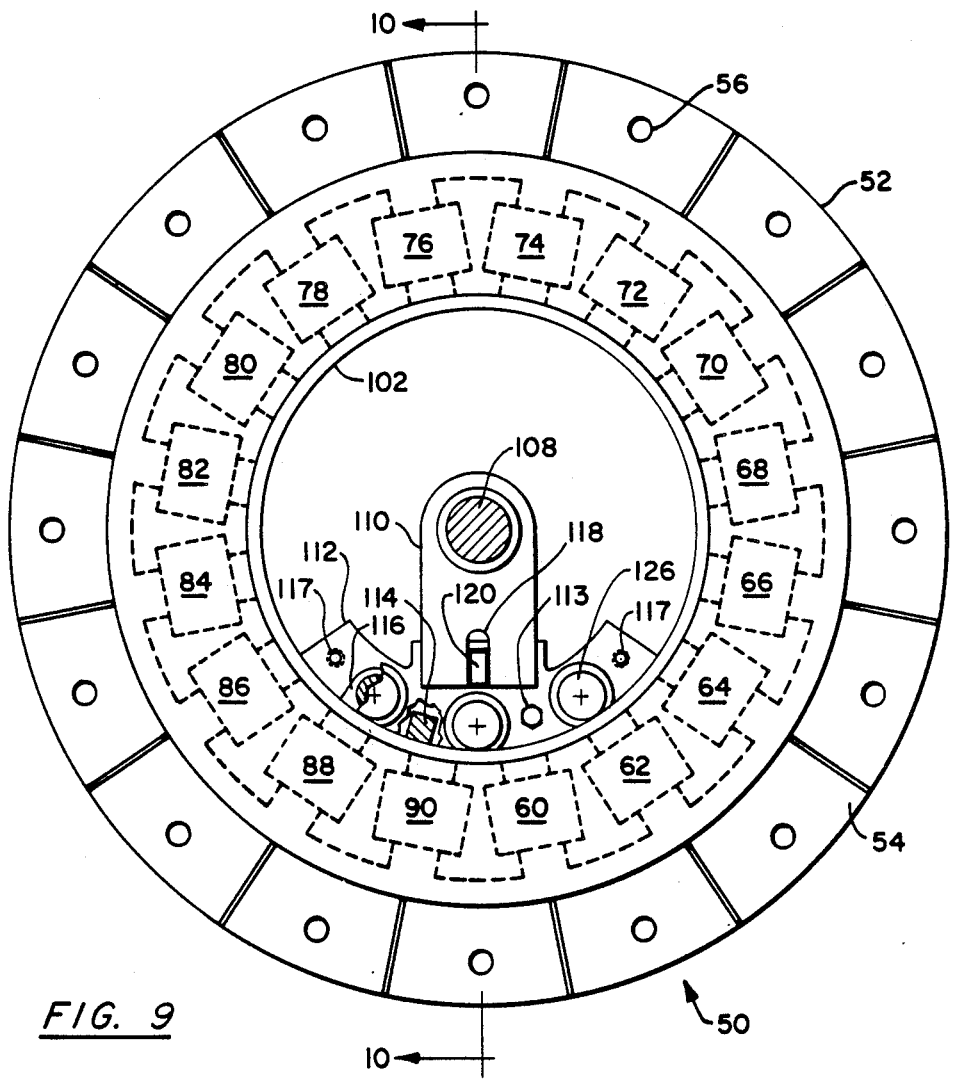
FIG. 9 is a vertical cross-section, transverse to the axis of rotation, of an embodiment disclosing the use of three rollers.

When replacing the existing orbiting mass is not sufficient to obtain a larger or smaller centrifugal force, a different roller carriage having a larger or smaller capacity in terms of number of rollers 126 may be employed. FIG. 9 shows a roller carriage 112 having three rollers 126. In this manner, the total orbiting mass may be increased to increase the resultant centrifugal force. It should be noted that in using a roller carriage 112 having three rolling masses 98 as opposed to a roller carriage 112 having two rolling masses 98, the moment arm, R, of the orbiting mass is slightly smaller due to the curvature of roller carriage 112. Roller carriage 112 as shown in FIG. 9 includes two pole pieces 114 extending transversely between a pair of spaced idler arms 110. Pole pieces 114 are radially adjustable and will be discussed in further detail with respect to FIG. 12 below. The control system sequence of energizing electromagnets 60-90 when more than a single pole piece is employed is discussed below with reference to FIGS. 17, 18 and 23.

Figure 10:
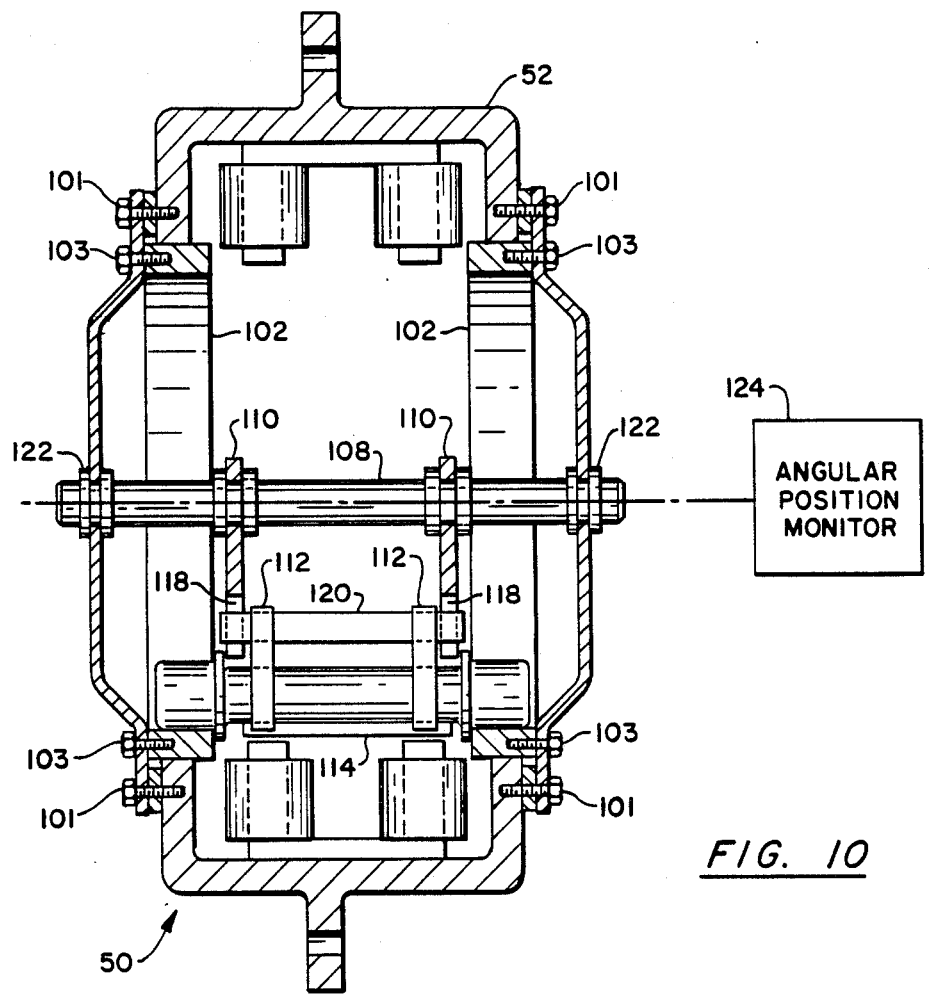
FIG. 10 is an axial cross-section of a vibration generator such as those of FIGS. 7, 8 or 9.
Figure 11:
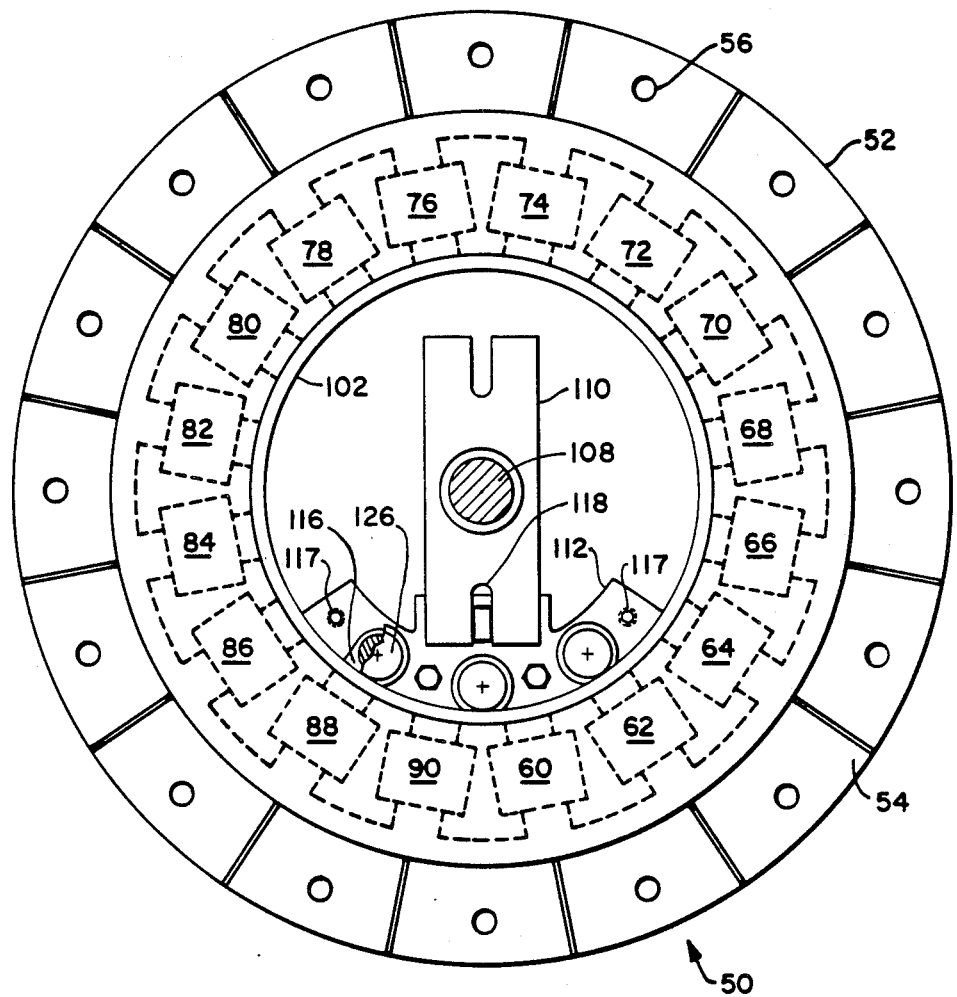
FIG. 11 is a vertical cross-section of a vibration generator showing a counterbalanced idler arm.

In the preferred embodiment, each of the pair of spaced idler arms 110 are fixedly mounted on shaft 108 and have a slot 118 to slidably engage cross member 120 of roller carriage 112 as best seen in FIG. 10. The slidable engagement permits radial movement of the roller carriage such that the centrifugal force generated by the orbiting mass is not transmitted to the housing through shaft 108 and bearings 122 but rather is transmitted to housin 52 through annular rings 102. As mass 98 orbits about annular rings 102 idler arm 110 is forced to rotate about the axis of shaft 108. Bearings 122 couple shaft 108 to housing 52 to reduce friction. The load on bearings 122 consist of the centrifugal force generated by idler arms 110. The centrifugal force generated by idler arms 110 may be eliminated by causing the center of gravity of idler arms 110 to coincide with the axis of shaft 108. This can be accomplished by extending idler arms 110 radially from shaft 108 in at least a second direction as shown in FIG. 11 such that the center of gravity of idler arm 110 coincides with the axis of shaft 108. This provides a balanced force on shaft 108 as the shaft idler arm rotates with a net null centrifugal force.

Figure 9A:
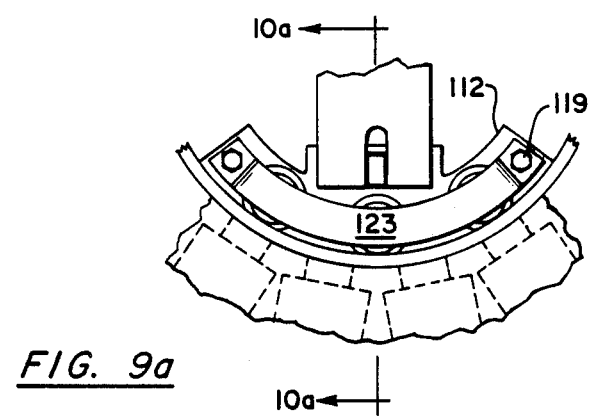
FIG. 9a illustrates an alternate embodiment of adding additional weight to the orbiting mass.
Figure 10A:
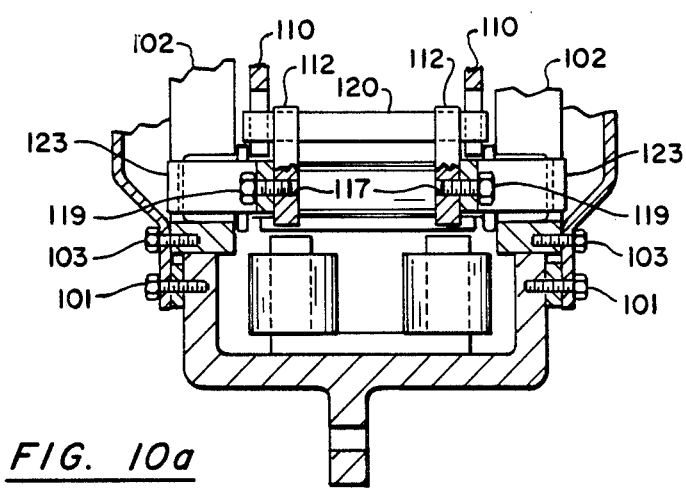
FIG. 10a illustrates an alternate embodiment of adding additional weight to the orbiting mass.

An alternate method of increasing the orbiting mass is shown in FIGS. 9a and 10a wherein additional mass 123 is secured such as by bolting to roller carriage 112. The addition of additional mass 123 in addition to changing the mass that orbits may also change the radius of the movment arm. Additional mass 123 in orbiting around the axis of shaft 108 passes between the ends of mass 98 and cover plates 100 in the preferred embodiment. The engagement between roller carriage 112 and idler arms 110 and in turn the engagement between idler arms 110 and shaft 108 provide a means of detecting the position of pole piece 114 that is useful in controlling the sequence of energizing then deenergizing electromagnets 60-90. Angular position monitor 124 monitors the angular orientation of shaft 108 which in turn is an indication of the location of pole piece 114. The use of the angular orientation of shaft 108 will be discussed below in conjunction with operation of a vibration generator 50.

Vibration generator 50 is operated by applying a direct current to each electromagnet 60-90 thereby establishing a magnetic flux circuit through core 92 of the energized electromagnet and the air gap between the poles of the electromagnet. Mechanical forces are created by the magnetic field attracting a magnetically permeable material tending to shorten the air gap between the attracted magnetically permeable material and the core of the electromagnet. The magnetically permeable material, depending upon design, is mass 98 in the embodiment of the invention shown in FIGS. 1, 2, 5, 6, 6a, 6b, 6c, 7 and the embodiments of FIGS. 8-11 when a pole piece 114 is not employed and mass 98 is a magnetically permeable material. When the magnetically permeable attracted mass is permitted to move, the flux changes and mechanical work is achieved.

By way of reference to FIGS. 1 and 3 but having application to other embodiments of the invention, with mass 98 initially at rest mass 98 seeks the position of lowest potential energy. Mass 98 is orbited about electromagnets 60-90 in a desired direction by sequentially energizing then deenergizing the electromagnets in the desired direction of orbiting. Consider orbiting mass 98 in the clockwise direction from the position of lowest potential energy. Hence electromagnet 90 is energized then deenergized. During the time period that electromagnet 90 is energized mass 98 is magnetically attracted toward and moves toward electromagnet 90. As the center of gravity of mass 98 approaches an imaginary line drawn between the axis of the circumferentially arranged array of electromagnets 60-90 and the centerline of energized electromagnet 90, electromagnet 90 is deenergized and the adjacent electromagnet in the desired direction of rotation, electromagnet 88, is energized. As mass 98 is attracted toward energized electromagnet 90 mass 98 rolls on the terminated ends of core 92 of electromagnet 90, much in the way a smaller circle is rolled along the inner surface of a larger circle to generate a hypocycloid. In so moving, work has been done on mass 98 thereby moving mass 98 from the position of lowest potential energy and increasing the potential energy of mass 98.

Similarly as a current is applied to electromagnet 88, a magnetic flux circuit is established that attracts mass 98 thereby causing mass 98 to roll on the terminated end of core 92 of electromagnet 90 thence onto the terminated end of core 92 of electromagnet 88 further increasing the potential energy of mass 98. The control system such as a microprocessor or programmable controller is particularly adaptable to repeating this process of sequentially energizing and deenergizing each electromagnet of the plurality of electromagnets 60-90 circumferentially around the horizontal axis in the desired direction of rotation thereby causing an apparent rotating magnetic field which in turn causes magnetically attractable mass 98 to move circumferentially toward the energized electromagnet. As mass 98 orbits, a centrifugal force is exerted on the terminated ends of core 92 of the electromagnet in contact with mass 98. The centrifugal force is transmitted through spacers 58 to housing 52 which is mounted utilizing holes 56 to transfer the centrifugal force to a process where it is utilized as vibration energy.

By selecting the sequence of energizing then deenergizing electromagnets 60-90, mass 98 can be made to orbit either in the clockwise direction or the counterclockwise direction. With mass 98 initially at rest and sequentially energizing then deenergizing electromagnets 60-90 in either a clockwise or counterclockwise direction and achieving the sustained orbiting of mass 98 in the first complete sequence of energizing magnetics 60-90 requires that the coils 94 and 96 of electromagnets 60-90 be sized for startup. Successful orbiting of mass 98 can be achieved by comparatively determining the duration that each electromagnet 60-90 should be energized and at what instant the energized electromagnet should be deenergized and the adjacent electromagnet in the direction of the desired rotation energized.

The above-described method of operating a vibration generator is applicable to all of the embodiments having a single magnetically permeable flux path between the pole pieces of an energized electromagnet. Such as those shown in FIGS. 1, 2, 5, 6, 7 and 8. Operation of vibration generators with more than one such flux path is very similar and such an example will be described below.

In a vibration generator having sixteen equally spaced electromagnets 60-90, annular rings 102, a magnetically attractable mass 98 weighing 200 lbs. at a moment arm radius of eleven inches required coils 94 and 96 of electromagnets 60-90 when sized for startup of 5000 amp-turns. Since less energy is required to maintain mass 98 orbiting than is required to initiate orbiting of mass 98, coils 94 and 96 of electromagnets 60-90 could be sized at 2100 amp-turns for continuous operation. When the coils 94 and 96 are sized for continuous operation, a pendulum-type startup may be used to initiate orbiting of mass 98.

Initiating orbiting of mass 98 in a pendulum-type startup from rest at the point of lowest potential energy is achieved by energizing an electromagnet on a first side of an imaginary plane passing substantially through the axis of the circumferentially spaced electromagnets and the point of lowest potential energy of mass 98. Mass 98 would be attracted to the energized electromagnet. The electromagnet remains energized, thereby imparting motion to mass 98 and simultaneously increasing the potential energy of mass 98. Since the coils of electromagnets 60-90 are not sized for startup it is not possible, by definition, to sequentially energize and then deenergize electromagnets 60-90 in the desired direction of rotation to achieve orbiting. Therefore, the energized electromagnet on the first side of the imaginary plane is deenergized thereby permitting mass 98 to reverse direction to return to the point of lowest potential energy, thereby converting the imparted potential energy to kinetic energy which is sufficient to cause mass 98 to pass the point of lowest potential energy to a second side of the imaginary plane passing substantially through the axis of the circumferentially spaced electromagnets and the point of lowest potential energy. An electromagnet on the second side of the imaginary plane is energized to magnetically attract mass 98 toward the energized electromagnet thereby increasing the potential energy of the mass on the second side of the imaginary plane. If sufficient potential energy has been imparted to mass 98, electromagnets 60-90 are sequentially energized in a predetermined sequence to sustain orbiting of mass 98. If sufficient potential energy has not been imparted to mass 98 to complete the first orbit, the energized electromagnet on the second side of the imaginary plane is deenergized, thereby permitting mass 98 to reverse direction to return to the point of lowest potential energy thereby converting the imparted potential energy on the second side of the imaginary plane to kinetic energy which is sufficient to cause mass 98 to pass the point of lowest potential energy, thereby passing through to the first side of the imaginary plane where one or more electromagnets are energized to impart additional potential energy to mass 98. This pendulum-type process is repeated until sufficient energy has been imparted to mass 98 such that mass 98 can make a complete orbit around the axis of the circumferentially spaced electromagnets 60-90. Thereafter, electromagnets 60-90 are sequentially energized then deenergized in a predetermined sequence to maintain the mass orbiting in the desired direction of rotation around the axis of the circumferentially spaced electromagnets 60-90.

The sequence of energizing then deenergizing the electromagnets 60-90 can vary with a great deal of latitude. The duration of energizing then deenergizing each electromagnet can be ascertained emperically or feedback from angular position monitor 124 may be used in conjunction with a control system. Either clockwise or counterclockwise direction of orbiting may be achieved by utilizing a pendulum-type startup.

Figure 13:
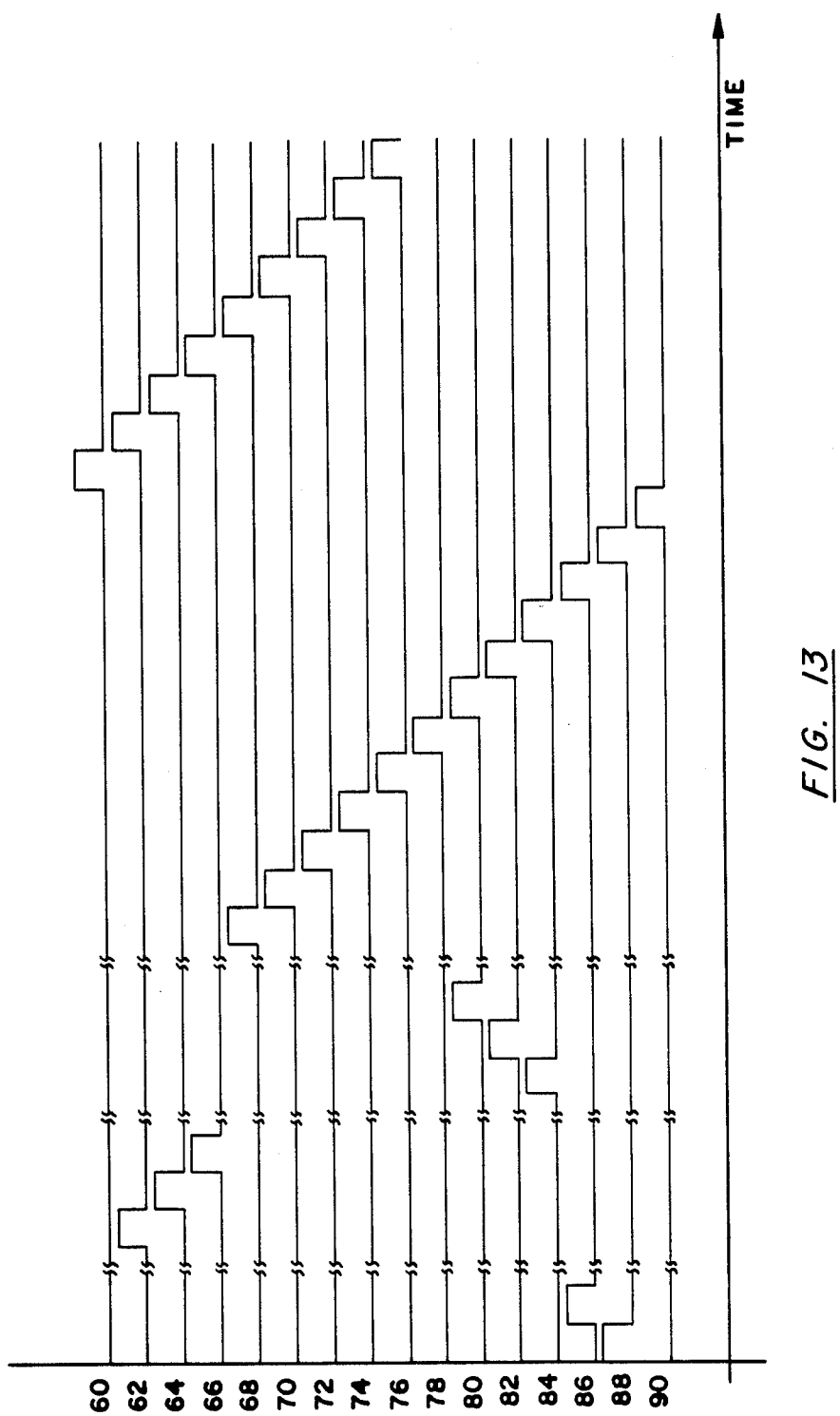
FIG. 13 is a schematic illustration of a timing diagram disclosing a predetermined sequence for energizing then deenergizing each electromagnet of a vibration generator designed in accordance with the present invention with a single pole piece illustrating a pendulum-type start-up resulting in apparent clockwise rotation of the magnetic field and clockwise orbiting of the loosely disposed mass.

One example of a pendulum-type startup resulting in counterclockwise orbiting of mass 98 is shown in FIG. 13. In FIG. 13 mass 98 initially at rest is attracted clockwise from the point of lowest potential energy by energized electromagnet 88 which imparts motion to mass 98 and increases potential energy of mass 98. As the center of gravity of mass 98 approaches an imaginary line drawn between the centerline of electromagnet 88 and the axis of the circumferentially arranged array of electromagnets 60-90, electromagnet 88 is deenergized and electromagnet 86 is energized. Electromagnet 88 ceases to magnetically attract mass 98; energized electromagnet 86 attracts mass 98, thereby imparting potential energy to mass 98. Electromagnet 86 is then deenergized permitting mass 98 to convert all kinetic energy to potential energy, then reverse direction from clockwise to counterclockwise and then return to the point of lowest potential energy between electromagnets 60 and 90. At the point of lowest potential energy mass 98 has sufficient kinetic energy to pass beyond the point of lowest potential energy. Electromagnet 62 is energized to attract mass 98. In turn electromagnets 64 and 66 are energized then deenergized as described above in the sequence of energizing then deenergizing the electromagnets. If sufficient energy has not been imparted to mass 98 to make a complete orbit or if sufficient additional energy cannot be imparted to mass 98 by sequentially energizing electromagnets 66-74 to make a complete orbit or if it is desired to have mass 98 orbit in the clockwise direction of rotation rather than the counterclockwise direction of rotation when electromagnet 66 is deenergizied, mass 98 is permitted to again reverse direction to return to and pass beyond the point of lowest potential energy. It is known emperically that for the above-described vibration generator having a 200 pound orbiting mass, a moment arm radius of eleven inches and sixteen equally spaced electromagnets each having 2100 amp-turn coils that upon deenergizing electromagnet 66 the 200 pound mass will roll clockwise past the electromagnets 64, 62, 60, 90, 88 and 86. Therefore, although these electromagnets could be sequentially energized then deenergized to impart energy to the 200 pound mass this startup sequence does not require that they be utilized. Thus, as the center of gravity of the 200 pound mass approaches an imaginary line drawn between the centerline of electromagnet 86 and the axis of the circumferentially arranged array of electromagnets 60-90, electromagnets 84, 82, then 80 are sequentially energized then deenergized. At this point in pendulum-type startup, if an idler arm 110 is not employed mass 98 is likely to separate from annular rings 102. Thus, once the center of gravity of mass 98 passes through a horizontal plane passing through the centerline of the array of electromagnets 60-90, mass 98 must possess sufficient energy such that the incremental energy imparted thereto by the electromagnets in the upper quarter of the array of electromagnets is sufficient to cause a complete orbit. This limits the amp-turn down sizing of the electromagnetic coils when no idler arm is employed. The pendulum-type startup of FIG. 13, although generally applicable, employs an idler arm 110. The 200 pound mass, having reached electromagnet 80, is permitted to reverse direction to return to the point of lowest potential energy. Idler arm 110 slidably engaged with lower carriage 112 prevents the carriage-idler arm-roller mass assembly from falling radially inward away from annular rings 102. Furthermore, flanges 106 prevent mass 98 from moving laterally. Hence, the roller-carriage-idler arm assembly is constrained to return to the point of lowest potential energy passing electromagnets 80, 82, 84, 86, 88 then 90.

At this point in the pendulum-type startup mass 98 contains sufficient kinetic energy to pass electromagnets 60, 62, 64 and 66. In the manner described above, electromagnets 68, 70 72 and 74 are sequentially energized, then deenergized. The energy possesed by mass 98 as the center of gravity of mass 98 passes an imaginary line drawn between the centerline of electromagnet 66 and the axis of the circumferentially arranged array of electromagnets 60-90 plus the energy imparted to mass 98 by electromagnets 68-74 is sufficient to cause mass 98 to make a complete orbit in the counterclockwise direction. When electromagnet 68 is energized all subsequent energizing and deenergizing of electromagnets is done in the predetermined sequence appropriate for the particular vibration generator 50. In this case, the predetermined sequence to sustain orbiting is simply sequentially energizing each electromagnet in the desired direction of rotation upon imparting sufficient energy to mass 98 to complete an orbit.

Figure 14:
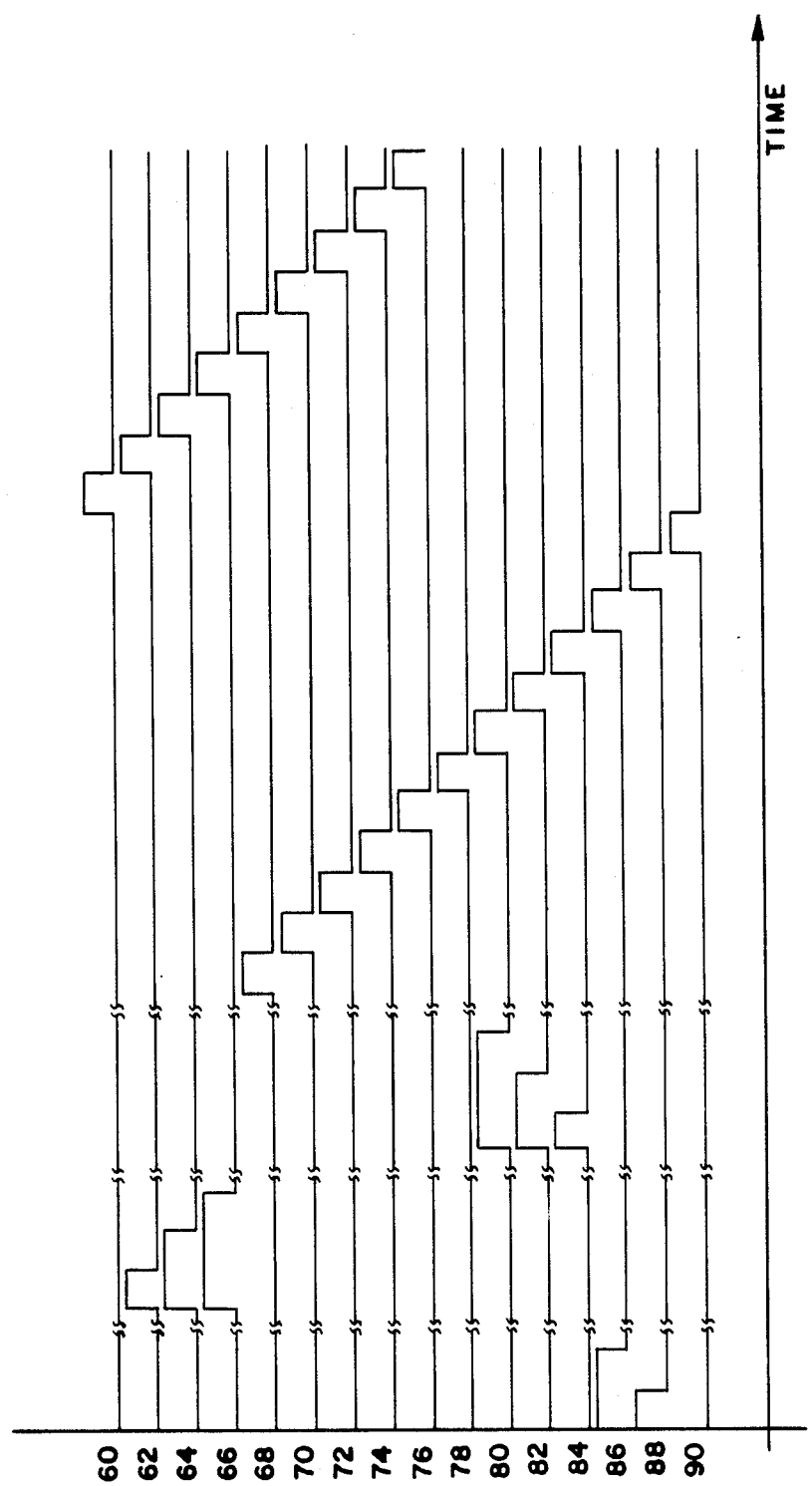
FIG. 14 is a schematic illustration of a timing diagram of an alternate embodiment of a predetermined sequence for energizing then deenergizing each electromagnet of the pendulum-type start-up of FIG. 13.

A variation of the above-described pendulum-type startup is shown in FIG. 14 wherein, as mass 98 is initially attracted away from the point of lowest potential energy both electromagnets 88 and 86 are energized until the center of gravity of mass 98 approaches an imaginary line drawn between the centerline of electromagnet 88 and the axis of the circumferentially arranged array of electromagnets 60-90 whereupon electromagnet 88 is deenergized leaving electromagnet 88 to attract mass 98. Subsequent to mass 98 reversing direction and passing through the point of lowest potential energy a similar attraction by multiply energized electromagnets occurs. Electromagnets 62, 64 and 66 may be simultaneously energized until the center of gravity of mass 98 approaches an imaginary line drawn between the centerline of electromagnet 62 and the axis of the circumferentially arranged array of electromagnets whereupon electromagnet 62 is deenergized leaving electromagnets 64 and 66 attracting mass 98. Upon the center of gravity of mass 98 approaching the centerline of energized electromagnet 64, electromagnet 64 is deenergized. Many such variations, too numerous to illustrate, are possible.

Figure 15:
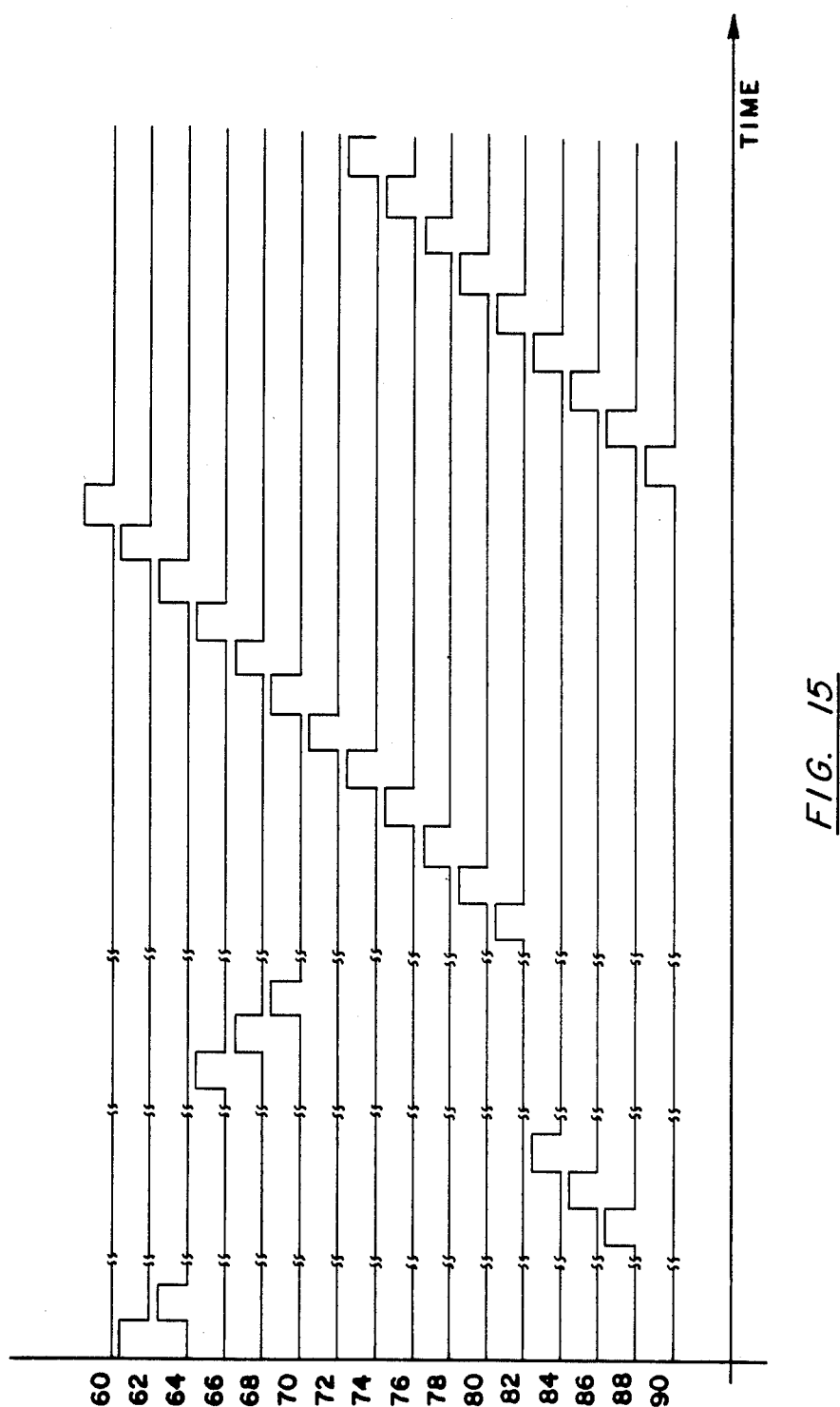
FIG. 15 is a schematic illustration of a timing diagram disclosing a predetermined sequence for energizing then deenergizing each electromagnet of a vibration generator designed in accordance with the present invention having a single pole piece illustrating a pendulum-type start-up resulting in apparent clockwise rotation of the magnetic field and clockwise orbiting of the loosely disposed mass.

To obtain a clockwise orbiting of mass 98 utilizing the pendulum-type startup the sequence of energizing, then deenergizing electromagnets 60-90 may be reversed from the sequence shown in FIG. 13 to the sequence shown in FIG. 15.

Figure 16:
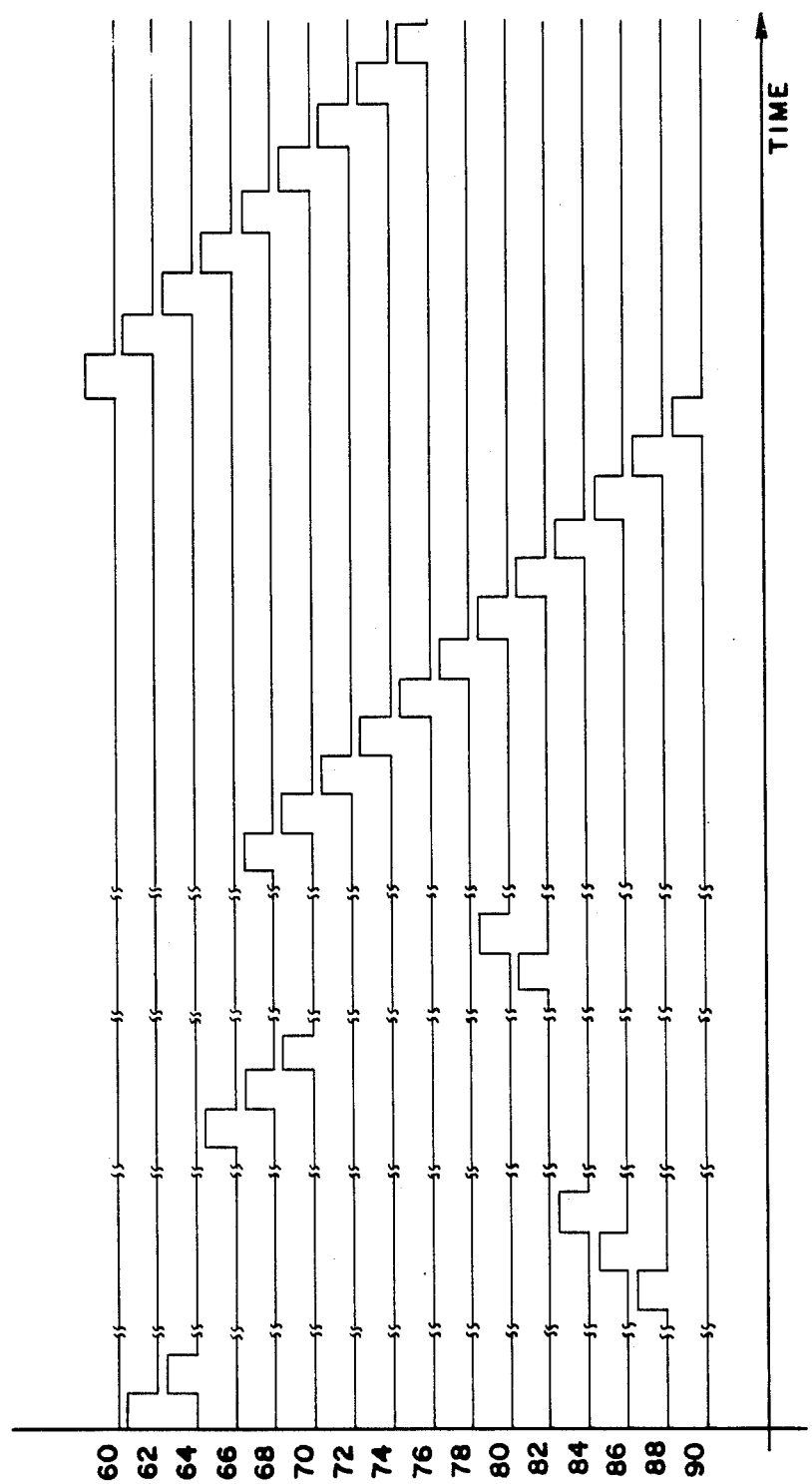
FIG. 16 is a schematic illustration of a timing diagram of an alternate embodiment of a predetermined sequence of energizing then deenergizing each electromagnet of a vibration generator designed in accordance with the present invention illustrating a pendulum-type start-up resulting in apparent counterclockwise rotation of the magnetic field and counterclockwise orbiting of the loosely disposed mass.

Alternatively, the sequence of energizing then deenergizing the electromagnets during a pendulum-type startup may be used to impart energy to mass 98 until mass 98 possesses sufficient energy that, although the incremental energy required to cause mass 98 to complete an orbit around the axis of the circumferentially arranged array of electromagnets 60-90 could be imparted thereto, that energy is not imparted to mass 98. If that condition occurs and the direction of orbiting of mass 98 is not the desired direction of orbiting, mass 98 is permitted to reverse direction to achieve orbiting in the desired direction of orbiting. An example is shown in FIG. 16 as compared with FIG. 15, the initial sequence of energizing then deenergizing the array of electromagnets 60-90 as shown in FIG. 16 could ultimately result in clockwise orbiting of mass 98. The sequence is identical through three complete swings of mass 98 and a portion of the fourth in which electromagnets 82 and 80 are energized, at that point in the pendulum-type startup it is known that mass 98 possesses sufficient energy which when the additional energy supplied by electromagnets 78 and 76 would be sufficient for mass 98 to orbit in a clockwise direction. Rather than supplying the incremental energy necessary for mass 98 to orbit in a clockwise direction, only electromagnets 82 and 80 are energized thereby supplying less than the required energy for mass 98 to orbit about the axis of the array of electromagnets. Mass 98 reverses direction passing through the point of lowest potential energy and sufficient energy is imparted in the opposite direction of rotation, here counterclockwise, to sustain orbiting. This is achieved in FIG. 16 by energizing electromagnet 68, thence sequentially energizing then deenergizing electromagnets 60-90 in a counterclockwise predetermined sequence to maintain mass 98 orbiting in the counterclockwise direction of rotation around the axis of the circumferentially spaced electromagnets.

Figure 17:
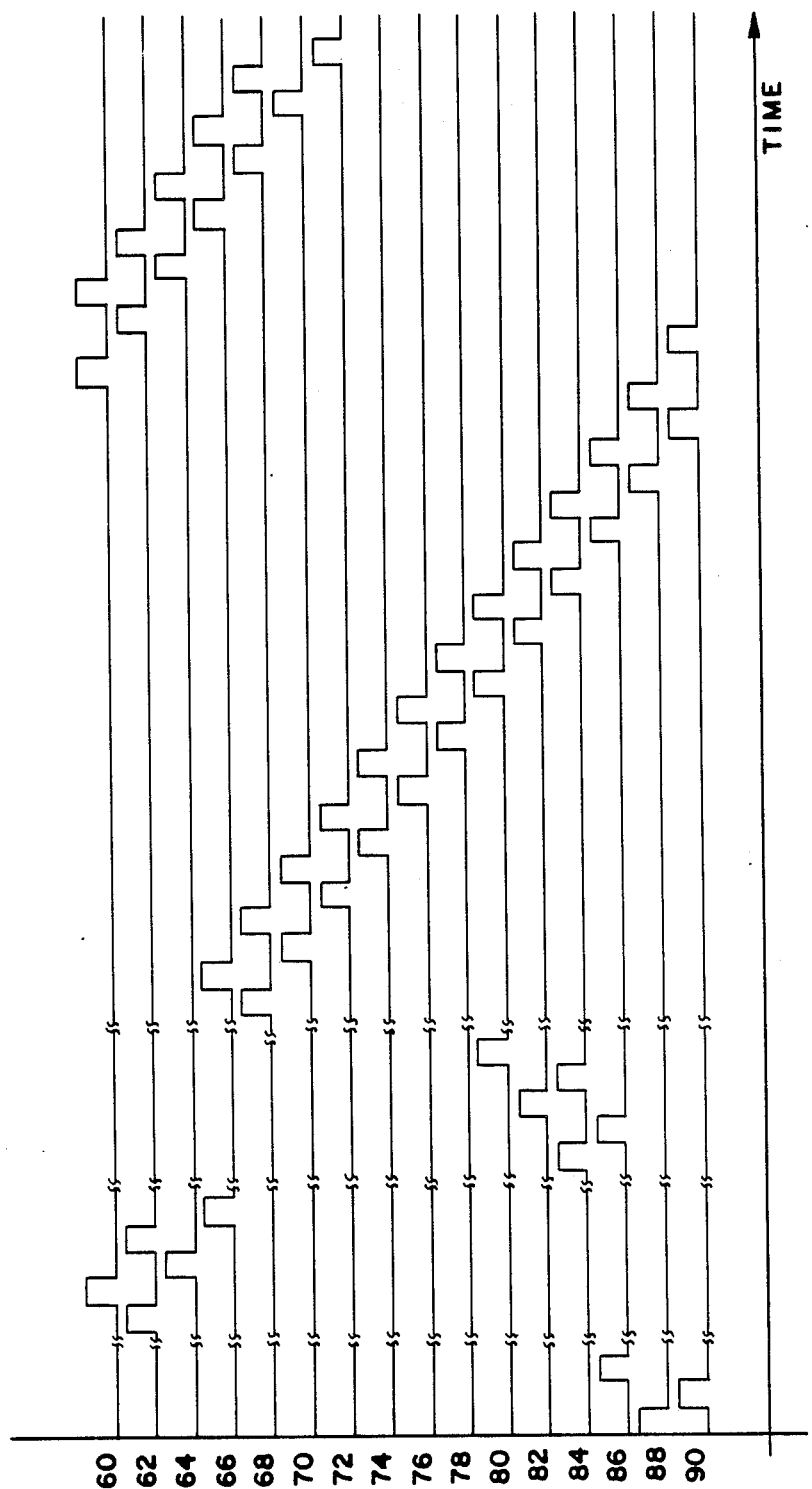
FIG. 17 is a schematic illustration of a timing diagram disclosing a predetermined sequence for energizing then deenergizing each electromagnet of a vibration generator designed in accordance with the present invention having two pole pieces illustrating a pendulum-type start-up resulting in apparent counterclockwise rotation of the magnetic field and counterclockwise orbiting of the loosely disposed mass.

The predetermined sequence in which electromagnets 60-90 are sequentially energized, then deenergized has heretofore been described as sequentially energizing, then deenergizing the electromagnets 60-90 in the direction of desired rotation. FIG. 17 discloses an alternative predetermined sequence of energizing then deenergizing electromagnets 60-90 for the pole piece-roller carriage assembly of FIG. 12. The angle between the centerline of pole pieces 114 and the axis of shaft 108 is one and one-half times greater than the angle between the centerline of adjacent electromagnets and the axis of shaft 108. When there are sixteen equally spaced electromagnets as in the preferred embodiment, the angle between the centerline of adjacent electromagnets and the axis of shaft 108 is 22.5° resulting in the angle between the centerline of pole pieces 114 and the axis of shaft 108 being 33.75°. Pole pieces 114 are radially adjustable such that the air gap 104 between pole piece 114 and core 92 may be adjusted. Adjusting air gap 104 may be necessary, for example, when rollers 126 are replaced with rollers of a different weight to obtain a different centrifugal force.

Figure 12:
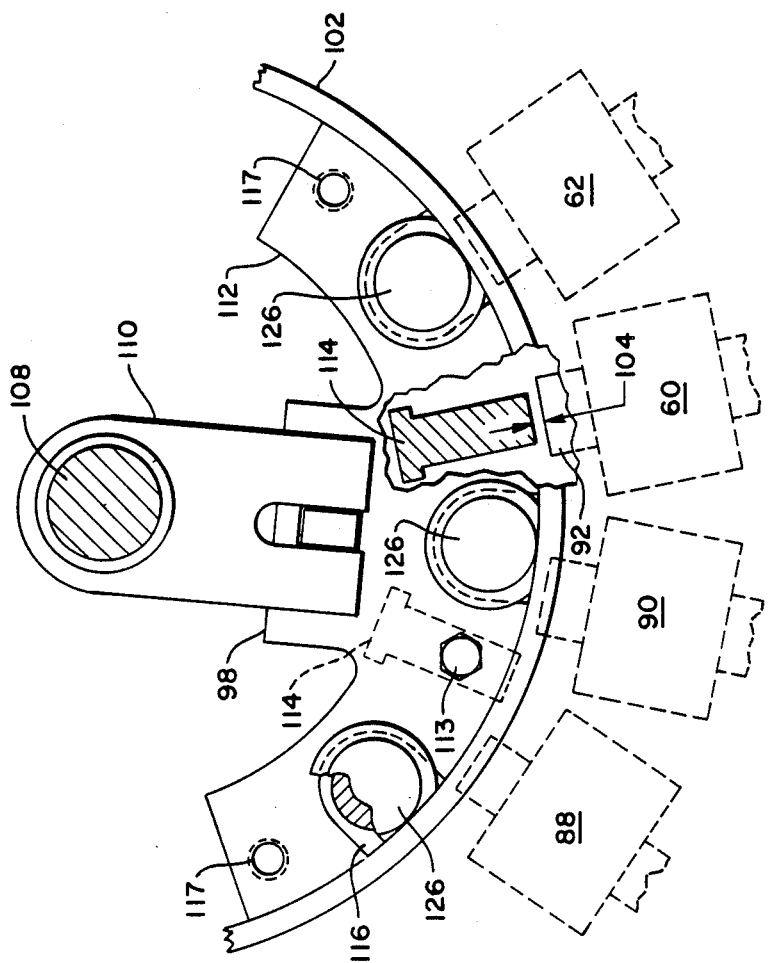
FIG. 12 is a detailed illustration of the roller carriage and weights of FIG. 9.

FIG. 17 shows the predetermined sequence of energizing then deenergizing electromagnets 60-90 of a vibration generator having the pole piece-electromagnet relationship of FIG. 12. Assume roller carriage 112 is rotating in the counterclockwise direction. The centerline of the rightmost pole piece 114 has approached the centerline of electromagnet 60. Thus, the control system has deenergized electromagnet 60. Electromagnet 90 is energized attracting the leftmost pole piece 114. As the centerline of the leftmost pole piece 114 approaches the centerline of energized electromagnet 90, electromagnet 90 is deenergized. At this point in the operation of vibration generator 50, the rightmost pole piece 114 is approximately halfway between electromagnets 60 and 62. Electromagnet 62 is then energized attracting rightmost pole piece 114 as well as roller carriage 112 and rollers 126. As the centerline of the right pole piece 114 approaches the centerline of electromagnet 62, electromagnet 62 is energized. At this point in the operation of vibration generator 50, the centerline of left pole piece 114 is approximately halfway between electromagnets 90 and 60. Electromagnet 60 is energized attracting the left pole piece 114 as well as roller carriage 112 and rollers 126. As the centerline of the left pole piece 114 approaches the centerline for electromagnet 60, electromagnet 60 is deenergized. This predetermined sequence of energizing then deenergizing electromagnets 60-90 is continued as shown in FIG. 17 to sustain orbiting of mass 98 in this arrangement including roller carriage 112, pole pieces 114 and rollers 126.

A pendulum-type startup of a vibration generator having the pole piece-electromagnet relationship of FIG. 12 is shown in the left portion of FIG. 17. This is one of many possible pendulum-type startup sequences for energizing then deenergizing electromagnets 60-90.

As should be evident by now, the predetermined sequence of energizing then deenergizing electromagnets 60-90 to sustain orbiting of mass 98 around the axis of shaft 108 then hence around the axis of the circular array of electromagnets 60-90 is dependent in part on the angular orientation of pole pieces 114 and electromagnets 60-90.

Figure 18:
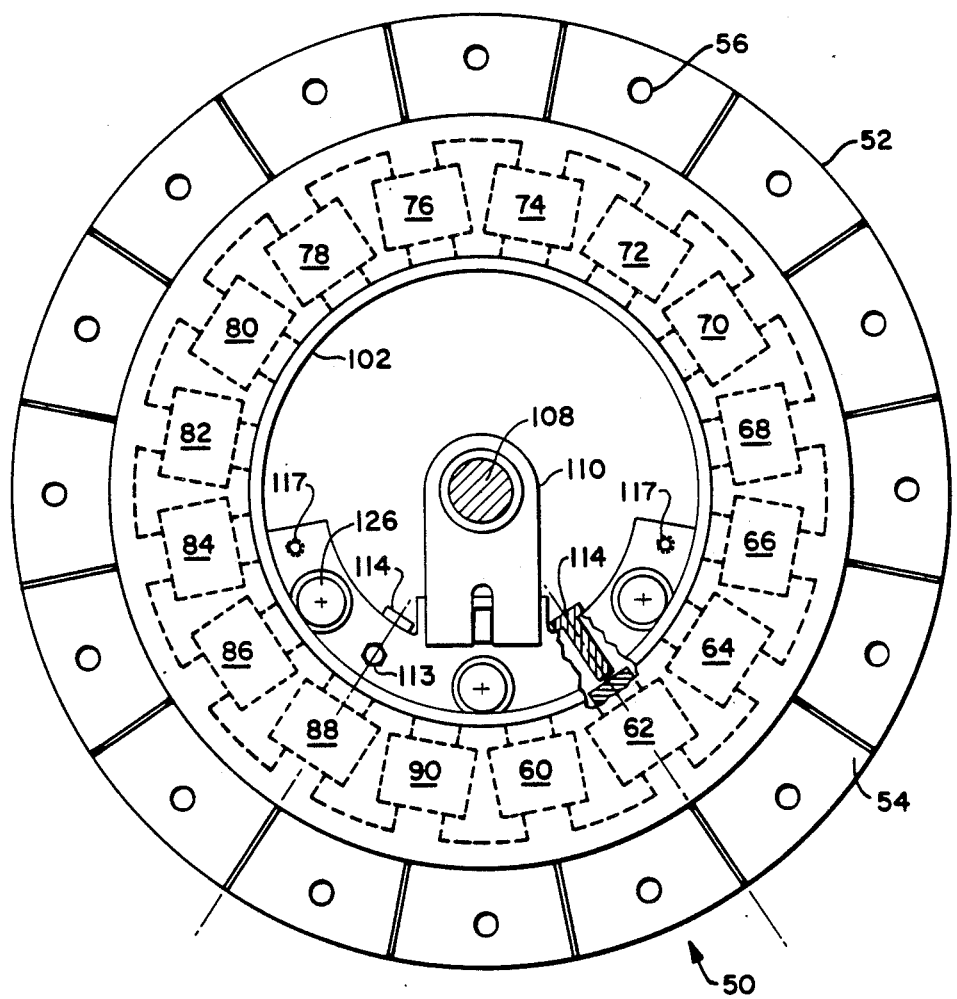
FIG. 18 is a detailed illustration of the imbalanced mass of FIG. 9 disclosing an alternate relationship between the pole pieces and the electromagnets.

All of the predetermined sequences of energizing then deenergizing electromagnets 60-90 hereabove described energize only one electromagnet at a time. It is contemplated within the scope of the invention that more than one electromagnet may be simultaneously energized. FIG. 18 discloses a mass 98 comprising roller carriage 112, pole pieces 114 and rollers 126 designed for the simultaneous energization and deenergization of two electromagnets in a predetermined sequence. In the embodiment of FIG. 18, electromagnets 60-90 still being sixteen in number have an angle between the centerline of adjacent electromagnets and the axis of shaft 108 of 22.5°. The angle between the centerlines of pole pieces 114 measured from the axis of shaft 108 is 67.5° such that when the centerline of the right pole piece 114 is colinear with the centerline of electromagnet 62 the centerline of the left pole piece 114 is simultaneously colinear with the centerline of electromagnet 88.

It is important that the force of attraction between an energized electromagnet and each of pole pieces 114 be such that the force of attraction is greater on one of the pole pieces than on the other. This can be achieved by appropriate angular spacing between the pole pieces and the axis of shaft 108 in conjunction with the predetermined sequence of energizing then deenergizing electromagnets 60–90.

Figure 19:
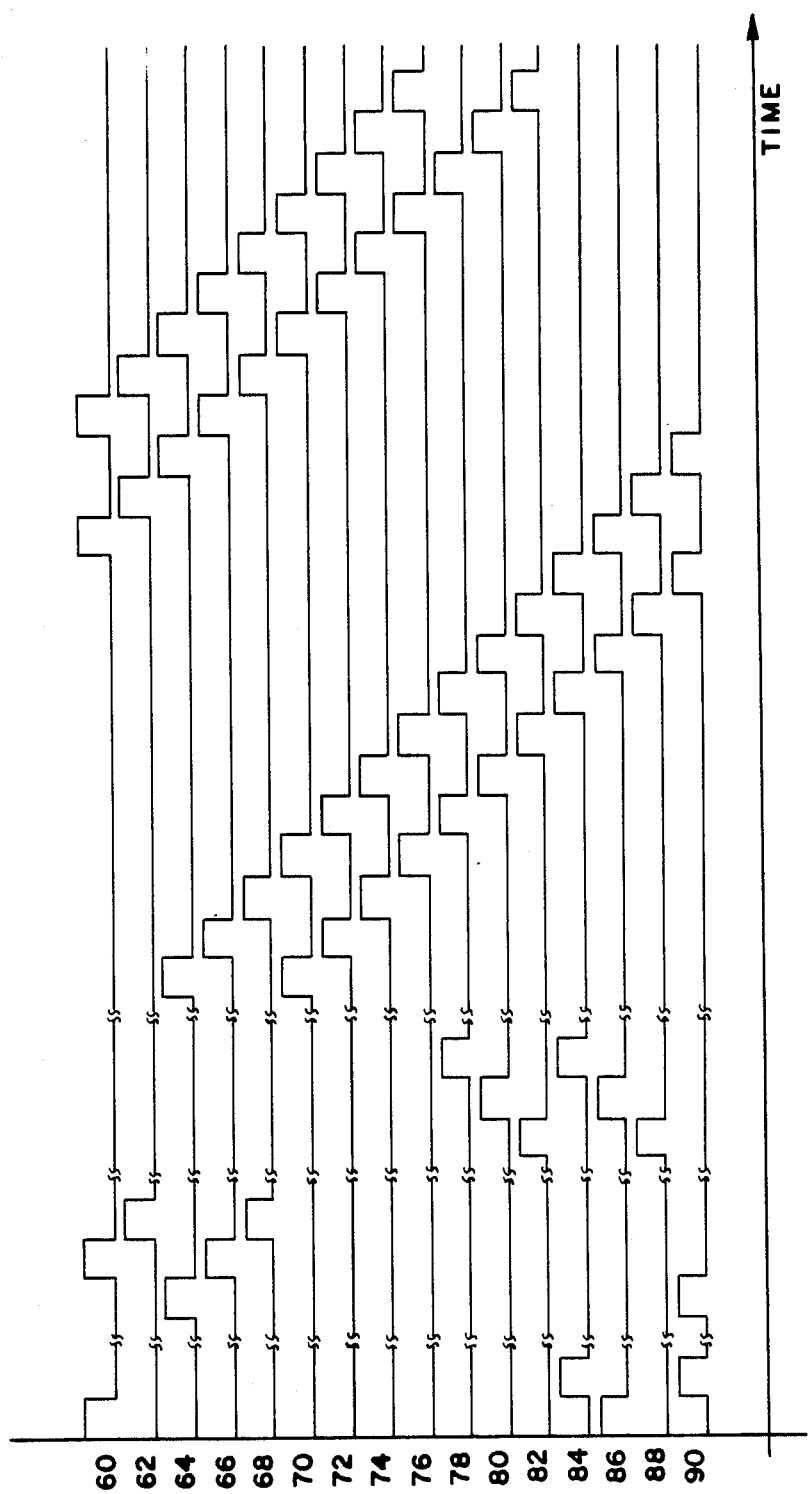
FIG. 19 is a schematic illustration of a timing diagram for a pendulum-type start up and counterclockwise operation of a vibration generator having the relationship between pole pieces and electromagnets of FIG. 18.

As shown in FIG. 18 the centerline of the left pole piece 114 is in line with the centerline of electromagnet 88 and the centerline of the right pole piece 114 is in line with the centerline of electromagnet 62, thus both electromagnets 88 and 62 are deenergized. Assuming counterclockwise rotation of mass 98, electromagnets 90 and 64 are simultaneously energized. At this point in the operation of vibration generator 50, energized electromagnet 90 is between the left and right pole pieces 114. Electromagnet 90 is closer to the left pole piece 114 than to the right pole piece 114 and therefore exerts a greater attractive force on the left pole piece 114. As mass 98 orbits counterclockwise and the centerline of left pole piece 114 approaches the centerline of energized electromagnet 90 simultaneous with the centerline of right pole piece 114 approaching the centerline of the energized electromagnet 64, electromagnets 90 and 64 are deenergized and electromagnets 60 and 86 are energized. This predetermined sequence of energizing then deenergizing electromagnets 60–90 is continued as shown in FIG. 19 to sustain orbiting of mass 98 about the axis of shaft 108.

Figure 22A:
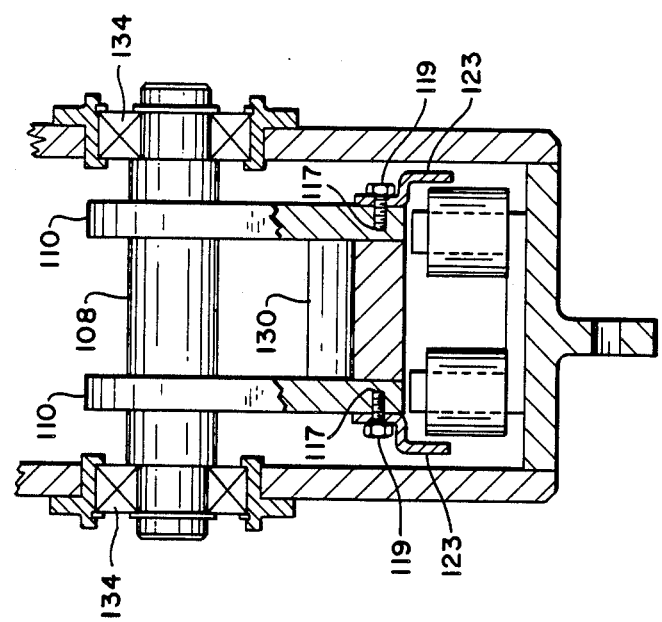
FIG. 22 is an axial cross-section of the vibration generator of FIG. 21.
Figure 22:
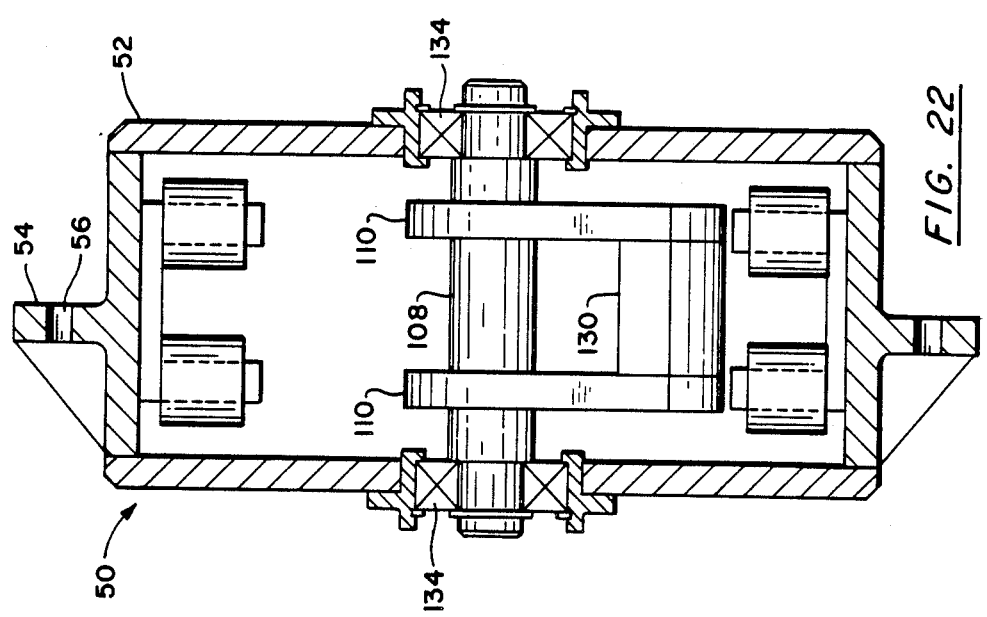

A sequence of energizing then deenergizing electromagnets 60–90 providing a pendulum-type startup resulting in counterclockwise orbiting of mass 98 is shown in FIG. 22 for the mass 98 of FIG. 18. As in the other embodiments of the present invention the duration of energizing the electromagnets may be determined empirically or may be controlled by the control system based upon the feedback signal provided by angular position monitor 124.

When vibration generator 50 is operated such that mass 98 orbits around the axis of shaft 108, mass 98 is accelerated downward by gravity as it moves upward on one side of shaft 108 and is accelerated downward by gravity as it moves downward on the other side of shaft 108. The current supplied to each of electromagnets 60–90 could be varied to offset the vertically downward gravitational force. It has been found that such current variations are not required.

Figure 20A:
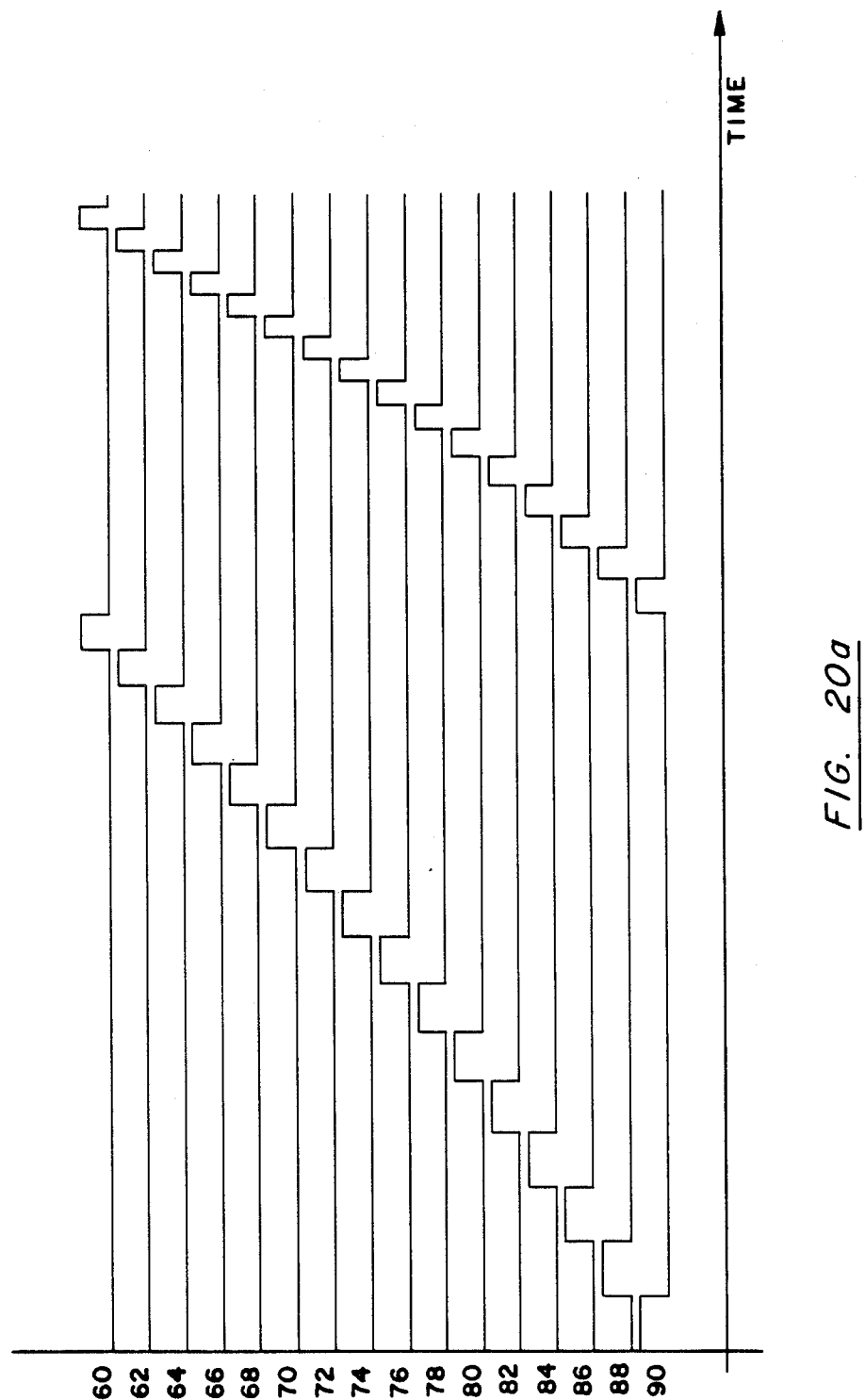
FIG. 20a is a schematic illustration of a timing diagram disclosing accelerating the rate of apparent rotation of the magnetic field and hence the rate of orbiting of the loosely disposed mass.

With mass 98 orbiting around the axis of shaft 108, it is often necessary to accelerate or decelerate the rate of orbiting. Deceleration is achieved in a manner opposite of acceleration. As shown in FIG. 20a, increasing the rate of orbiting mass 98 is achieved by accelerating mass 98. To accelerate mass 98, a greater attractive force must be provided between mass 98 and the energized electromagnet or electromagnets providing the attractive force. Of course, any acceleration of mass 98 must comply with Newton's Law. To increase the attractive force provided by an energized electromagnet, since the magnetic force generated is proportional to the current energizing an electromagnet, a larger current is supplied to energize the appropriate electromagnet or electromagnets in the predetermined sequence of vibration generator 50. Returning to the embodiment of FIGS. 1, 5, 7 or 8 due to their simplicity, acceleration is achieved by energizing each electromagnet in the predetermined sequenCe of vibration generator 50 with a current of greater magnitude than energized the previously energized electromagnet in the predetermined sequence and for a shorter duration. Each electromagnet is energized until the center of gravity of mass 98 approaches an imaginary line drawn between the centerline of the energized electromagnet and the axis of the circumferentially arranged array of electromagnets 60–90. In this manner, after mass 98 possesses enough energy to make a complete orbit around the axis of the circumferentially arranged array of electromagnets the rate of orbiting of mass 98 may be increased.

Deceleration is achieved by energizing each electromagnet in the predetermined sequence of vibration generator 50 with a current of lesser magnitude than energized the previously energized electromagnet in the predetermined sequence and for a longer duration. Each electromagnet is energized until the center of gravity of mass 98 approaches an imaginary line drawn between the centerline of the energized electromagnetic and the axis of the circumferentially arranged array of electromagnets 60–90. In this manner, mass 98 is decelerated from a higher rate of orbiting to a lower rate of orbiting.

With reference to the embodiment of FIGS. 1, 5, 7 or 8 due to their simplicity, but keeping in mind that the principle is applicable to all embodiments of the present invention, acceleration between a lower rate of orbiting and a higher rate of orbiting of mass 98 is shown in FIG. 20a. The predetermined sequence of energizing electromagnets 60–90 shows a constant lower rate of orbiting of mass 98 by the uniform longer duration of energizing electromagnets 90, 88 and 86. Electromagnets 84, 82, 80, 78, 76, 74, 72, 70 and 68 are each energized with a current of greater magnitude than energized the previously energized electromagnet in the predetermined sequence and for a shorter duration. Electromagnets 66 through 60 and in a subsequent orbit electromagnets 90 through 60 are energized with a uniform current and for a uniform shorter duration representing the higher rate of orbiting of mass 98.

The precise amount of current and the number of orbits or fractions thereof required to achieve acceleration or deceleration depends upon the mass of orbiting mass 98, the initial rate of orbiting of mass 98, the final desired rate of orbiting of mass 98, and the rate of acceleration or deceleration of mass 98 between the two rates of orbiting. FIG. 20 shows accelerating mass 98 between a slower rate of orbiting and a faster rate of orbiting requiring varying the current and duration of energizing of only nine electromagnets which represents less than one complete orbit of mass 98. A faster rate of orbiting would require varying the current and duration of energizing fewer electromagnets whereas a slower rate of orbiting would require varying the current and duration of energizing more electromagnets perhaps even requiring several orbits to achieve acceleration or deceleration.

Figure 20B:
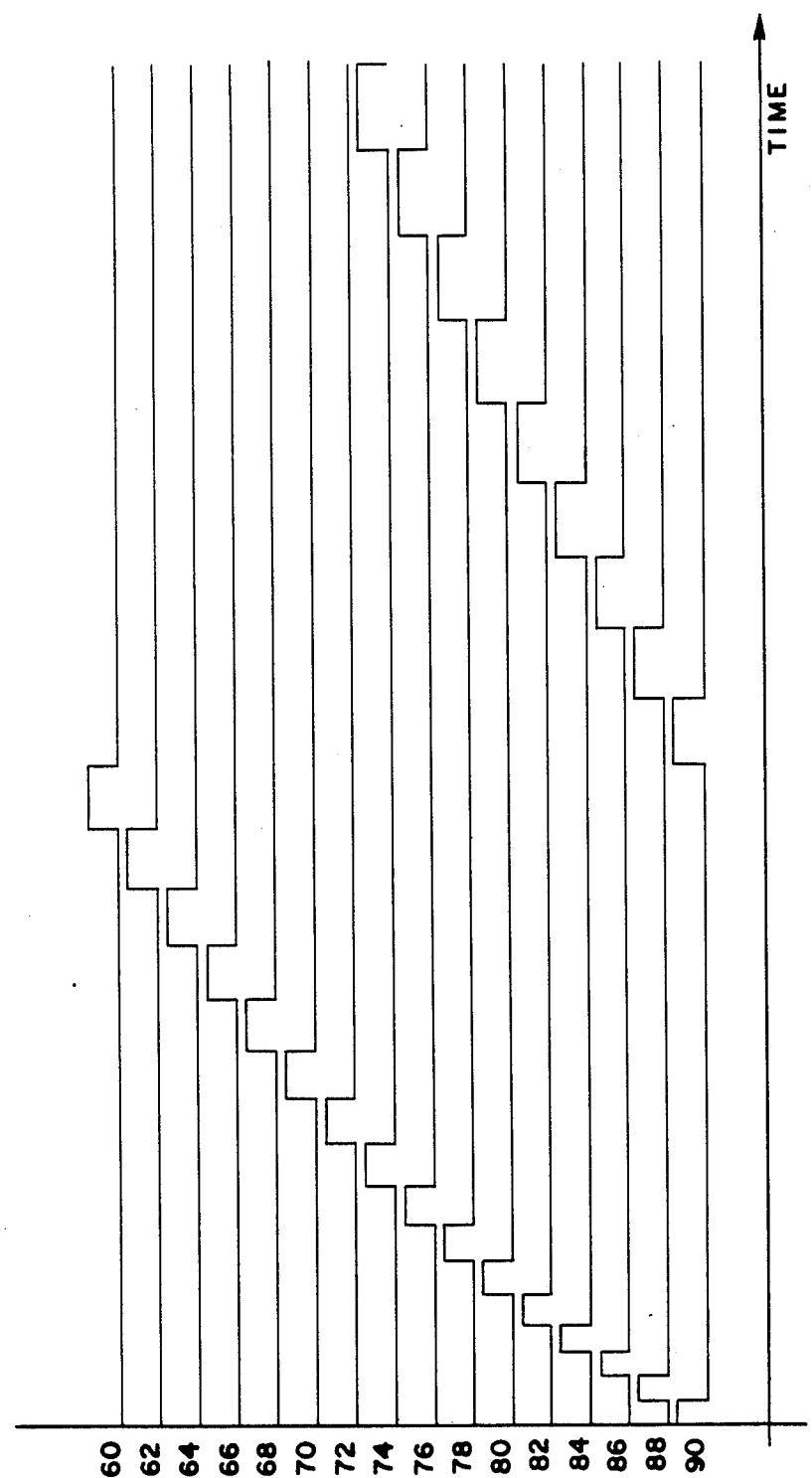
FIG. 20b is a schematic illustration of a timing diagram disclosing decelerating the rate of apparent rotation of the magnetic field and hence the rate of orbiting of the loosely disposed mass.

FIG. 20b shows decelerating the rate of orbiting of mass 98 from a higher rate of orbiting to a slower rate of orbiting wherein the deceleration requires more than a single orbit. The higher rate of orbiting is initially represented by the shorter duration of energizing electromagnets 90, 88 and 86. In decelerating, each electromagnet in the predetermined sequence of vibration generator 50 is energized with a current of lesser magnitude than energized the previously energized electromagnet in the predetermined sequence and for a longer duration. The duration of energizing electromagnets 86 through 60 as well as electromagnets 90 through 76 in a subsequent orbit are shown as being energized for a greater duration than the previously energized electromagnet. The rate of orbiting of mass 98 is maintained constant thereafter as shown by the duration of energizing electromagnets 74 and 72 being the same.

A microprocessor based control system or programmable controller is particularly suited for controlling the energizing and deenergizing of electromagnets 60-90 in a predetermined sequence. A model TI5 programmable controller manufactured by Texas Instruments has been used. Furthermore, such a control system is capable of providing the changing rate of energizing and deenergizing the electromagnets in a predetermined sequence as well as the current control to achieve acceleration or deceleration of mass 98. It is further noted that these types of control systems are capable of simultaneously controlling several such vibration generators 50.

Acceleration or deceleration is most readily achieved when angular position monitor 124 provides a feedback signal to the control system 128 to inform the control system of the current position of mass 98. Monitoring the position of mass 98 relative to the centerline of the energized electromagnet provides the control system 128 the precise location of mass 98, such that as the centerline of mass 98 approaches an imaginary line drawn between the centerline of the energized electromagnet and the axis of the circumferentially arranged array of electromagnets control system 128 can deenergized the energized electromagnet and energize the next electromagnet in the predetermined sequence.

Figure 21:
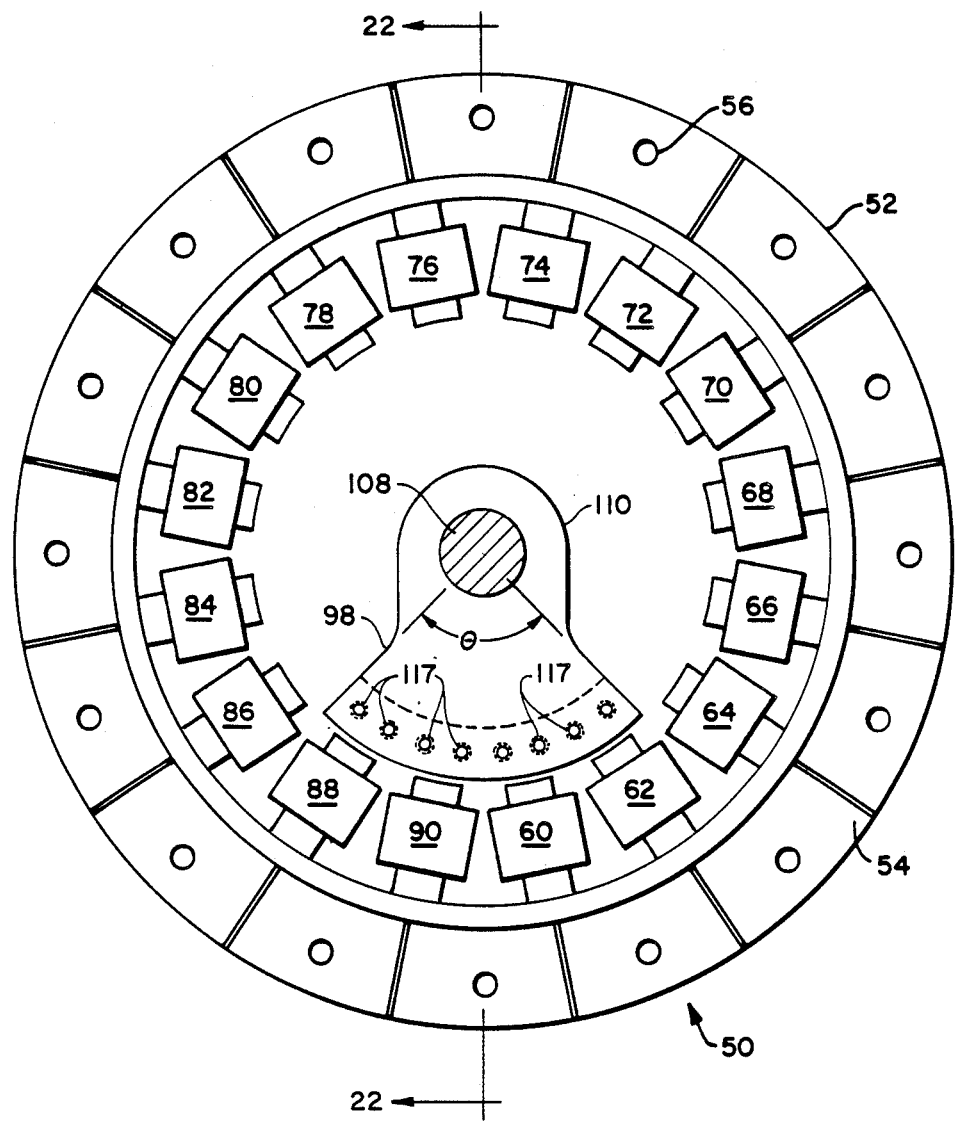
FIG. 21 is a vertical cross-section transverse to the axis of rotation, of an alternate embodiment of a vibration generator having an imbalanced mass on the shaft.
Figure 23:
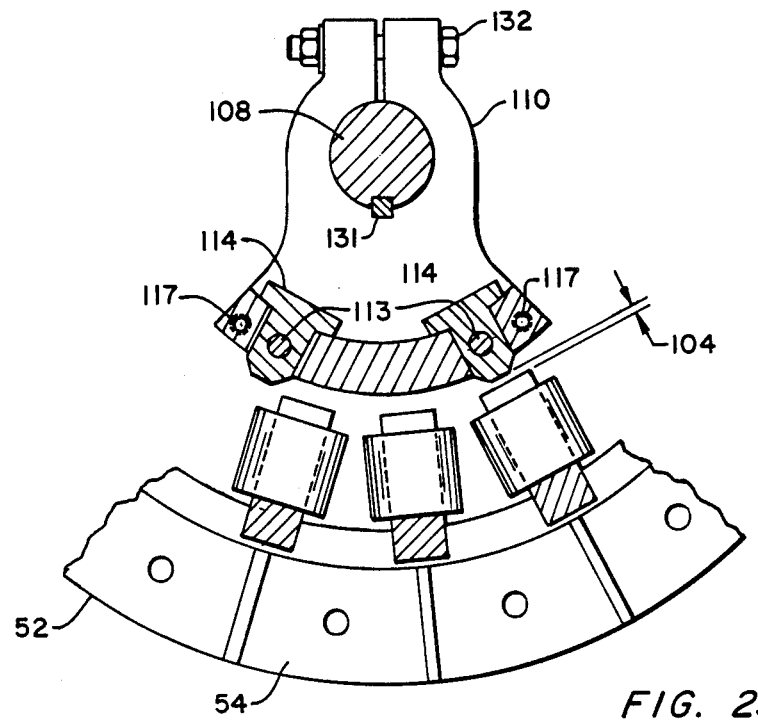
FIG. 23 is a detailed illustration of the imbalanced mass of FIG. 21 disclosing one relationship between the pole pieces and the electromagnets.

In an alternative embodiment of the invention shown in FIGS. 21-23 the orbiting mass includes a pair of spaced idler arms 110 mounted on shaft 108 to the same angular orientation as shaft 108 by key 131 and bolt 132. The orbiting mass may itself be a pole piece or may have one or more magnetically permeable pole pieces 114 mounted transversely between spaced idler arms 110. In a preferred embodiment, pole piece 114 is mounted in a groove in, and is secured to idler arms 110 by bolts 113 having an eccentric shank such that pole piece 114 is radially adjustable to vary the air gap between pole piece 114 and core 92. Rotating bolts 113 through 180° adjusts the air gap from maximum to minimum. Of course the smaller the air gap the greater the magnetic force between core 92 and pole piece 114. A 1.5 millimeter (0.063 inch) to 3.0 millimeter (0.125 inch) air gap has been found acceptable.

In this embodiment of the invention shaft 108 transfers the centrifugal force generated by orbiting mass 98 to bearings 134 which in turn transfer the centrifugal force to housing 52, thence to a process wherein the centrifugal force is utilized as vibration energy. Electromagnets 60-90 are sequentially energized, then deenergized a predetermined sequence as described above. The control signals that energize electromagnets 60-90 are initiated by control system 128 and conducted through housing 52 to each of the plurality of the electromagnets 60-90 by appropriate conductors.

The weight of orbiting mass 98 may be varied by increasing or decreasing the angle of the cylindrical sector 130 extending transversely between idler arms 110. It should be noted that increasing the angle of the cylindrical sector not only increases the weight of mass 98 but also decreases the radius of the moment arm. Alternatively, additional weight may be secured to orbiting mass 98 by securing additional mass 122 to idler arms 110 as shown in FIG. 22b.

Figure 24:
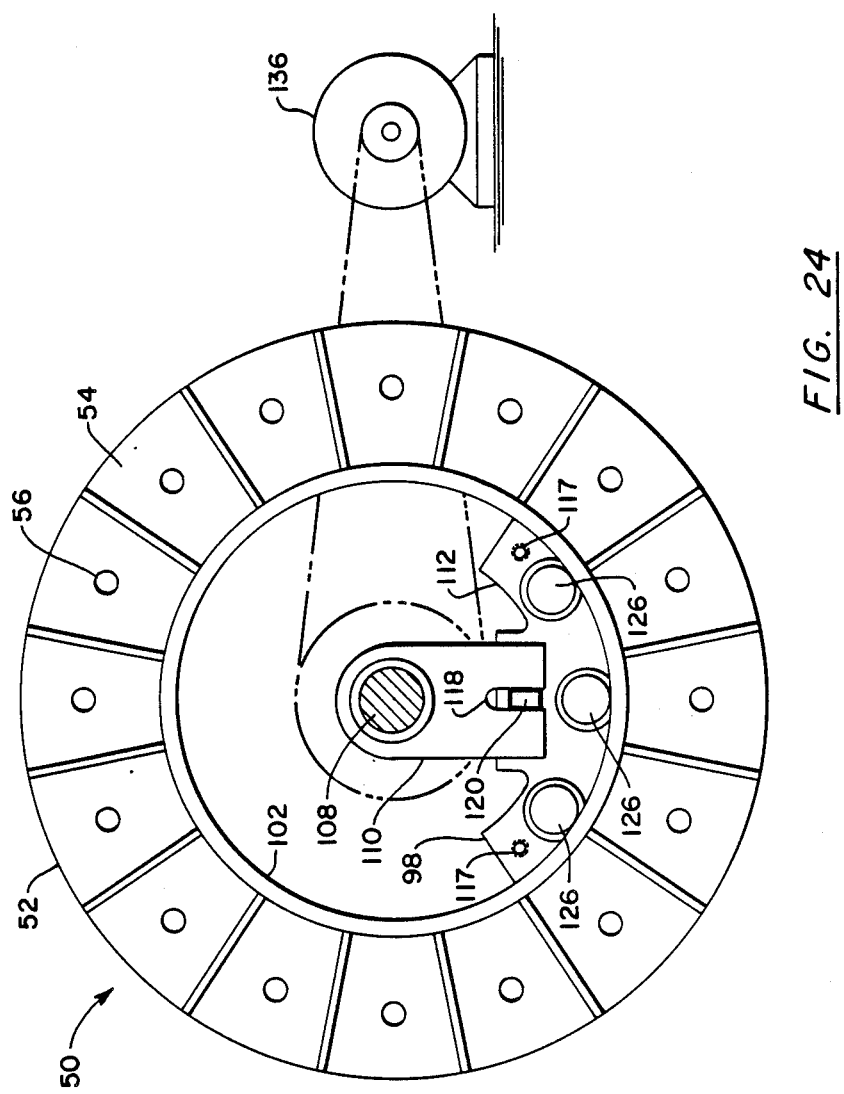
FIG. 24 is an alternate embodiment of a vibration generator illustrating driving the loosely disposed mass with an idler arm fixedly attached to a shaft that is driven by an external source.

In an alternate embodiment shown in FIG. 24, vibration generator 50 has within housing 52 a substantially cylindrical interior cavity. Mass 98 consisting of roller carriage 112 and rollers 126 are driven around annular raceway 102 by an external power source 136, such as an electric motor, driving shaft 108 and idler arm 110 which slidably engages cross member 120 of roller carriage 112 in slot 118. When shaft 108 is rotated by external power source 136, mass 98 is driven circumferentially around the interior of the housing cavity on annular rings 102 such that a centrifugal force is exerted on the annular ring and transmitted to housing 52 and thence to a process where it is utilized as vibration energy. In this embodiment of the invehtion there is essentially no radial load on shaft 1OB due to orbiting mass 98. Of course, as described above, idler arm 110 may be counterbalanced, rollers 126 may have a flange 106 to engage annular rings 102 and shaft 108 may be coupled to housing 52 by bearings 134 for reducing friction.

The present invention contemplates a method for inducing vibration using two of the above-described vibration generators. A common control system controls the sequential energizing and deenergizing in the predetermined sequence of each vibration generator of the array of electromagnets establishing an apparent rotating magnetic field which in turn causes the magnetically attractable mass 98 to move circumferentially in an orbiting manner toward the energized electromagnet or electromagnets in each vibration generator. Each vibration generator generates a centrifugal force that vectorially sums with the centrifugal force generated by the other vibration generator such that the net centrifugal force of the two vibration generators is the vibration energy utilized in a process.

Figure 25:
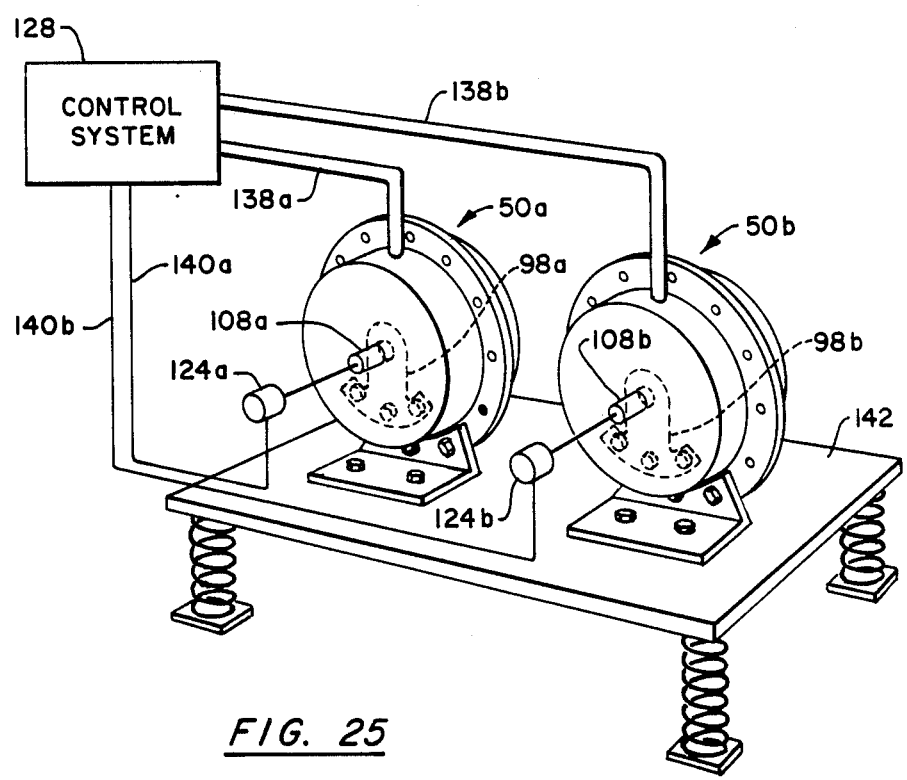
FIG. 25 illustrates the operation of two vibration generators wherein the vibration energy is the net centrifugal force of the two generators.

As best shown in FIG. 25, vibration generators 50a and 50b have a common control system 128 for sequentially energizing and deenergizing the electromagnets of the respective vibration generator in the predetermined sequence of each vibration generator. The axis of the circumferentially arranged array of electromagnets of vibration generator 50a is substantially parallel to the axis of the circumferentially arranged array of electromagnets of vibration generator 50b. In this manner, there is no component of the net centrifugal force of vibration generators 50a and 50b along the axes of the circumferentially arranged array of electromagnets. Control system 128 initiates the orbiting of mass 98a around the axis of the circumferentially arranged array of electromagnets of vibration generator 50a. The control signals generated by common control system 128 are conducted to vibration generators 50a by multiconductor cable 138a. The control signals are conducted through housing 52a to sequentially energize, then deenergize in a predetermined sequence each electromagnet of the circumferentially arranged array of electromagnets of vibration generator 50a, causing magnetically attractable mass 98a to orbit in a desired direction of rotation.

A desired orbiting rate is selected and control system 128 accelerates the rate of energizing then deenergizing the electromagnets in the predetermined sequence of vibration generator 50a to achieve the desired rate of orbiting mass 98a. The desired rate of orbiting mass 98a is maintained constant while orbiting mass 98b of vibration generator 50b is commenced. Mass 98b is caused to orbit around the axis of vibration generator 50b.

Mass 98*b* is caused to orbit around the axis of the circumferentially arranged array of electromagnets of vibration generator 50*b* in the same manner as mass 98 was caused to orbit around the axis of the circumferentially arranged array of electromagnets of vibration generator 50*a*. Control system 128 sequentially energizes, then deenergizes each electromagnet of the circumferentially arranged array of electromagnets of vibration generator 50*b* in the predetermined sequence of vibration generator 50*b*. The control signals are conducted to vibration generator 50*b* from control system 128 on cable 138*b*. After mass 98*b* rotates about the axis of the circumferentially arranged array of electromagnets of vibration generator 50*b* the rate of orbiting of mass 98*b* is accelerated by control system 128 by accelerating the rate of energizing then deenergizing the electromagnets of vibration generator 50*b* in the predetermined sequence of vibration generator 50*b* and increasing the current to each electromagnet until mass 98*b* is orbiting at a preselected rate. If the preselected rate of orbiting mass 98*b* is identical to the predetermined rate of orbiting mass 98*a* a desired phase relationship between the vectorial centrifugal force of vibration generators 50*a* and 50*b* may be established by establishing a phase relationship between orbiting masses 98*a* and 98*b*.

In this manner, the phase relationship between the vectorial centrifugal force produced by vibration generators 50*a* and 50*b* is controlled electrically by controlling the phase relationship between the orbiting masses 98*a* and 98*b*, which in turn is controlled by energizing, then deenergizing electromagnets in the circumferentially arranged array of electromagnets of vibration generators 50*a* and 50*b* to cause apparent rotating magnetic fields which attract orbiting mass 98*a* and 98*b*, respectively.

It is not necessary that mass 98*a* orbit at the same rate mass 98*b*. The rate of orbiting of mass 98*a* may be an integral or nonintegral multiple of the rate orbiting mass 98*b*.

Further, it is not necessary that mass 98*a* orbit in the same direction as mass 98*b*. Hence, both mass 98*a* and mass 98*b* may orbit in the clockwise direction, both mass 98*a* and mass 98*b* may orbit in the counterclockwise direction or mass 98*a* and mass 98*b* may orbit in opposite directions with mass 98*a* orbiting clockwise while mass 98*b* orbits counterclockwise or with mass 98*a* orbiting orbiting counterclockwise while mass 98*b* orbits clockwise. Vibration generators 50*a* and 50*b* produce a net vectorial force that provides vibration energy to an apparatus being vibrated.

While vibration generators 50*a* and 50*b* may be identical, they need not be. The differences between vibration generator 50*a* and 50*b* need not be physical but rather include differences in the predetermined sequence of energizing then deenergizing the respective circumferential array of electromagnets.

When vibration generators 50*a* and 50*b* are of an embodiment that includes a shafts 108*a* and 108*b*, respectively, feedback control signal indicating the angular orientation of shaft 108 may be employed to control the energizing, then deenergizing of the electromagnets. The angular orientation of shaft 108*a* of vibration generator 50*a* is monitored by angular position monitor 124*a* which provides an angular position feedback signal to control system 128 on feedback conductor 140*a*. Similarly, the angular orientation of shaft 108*b* of vibration generator 50*b* is monitored by angular position monitor 124*b* which provides a shaft position feedback signal to control system 128 on feedback conductor 140*b*. The angular position of shaft 108*a* and 108*b* is used by control system 128 as an indication of the position of orbiting masses 98*a* and 98*b* respectively.

Housing 52*a* and 52*b* are mounted on table 142 such that the net centrifugal force of vibration generators 50*a* and 50*b* result in vibration energy that is tranferred to table 142.

The invention further contemplates a method of inducing vibration using four vibration generators of the type hereindescribed. Of the four vibration generators, two are operated as a first pair with the rate of orbiting of the orbiting mass therein electrically synchronized. The two remaining vibration generators are operated as a second pair with the rate of orbiting of the mass therein also electrically synchronized and further in a desired phase relationship with the synchronized orbiting masses of the first pair.

Figure 26:
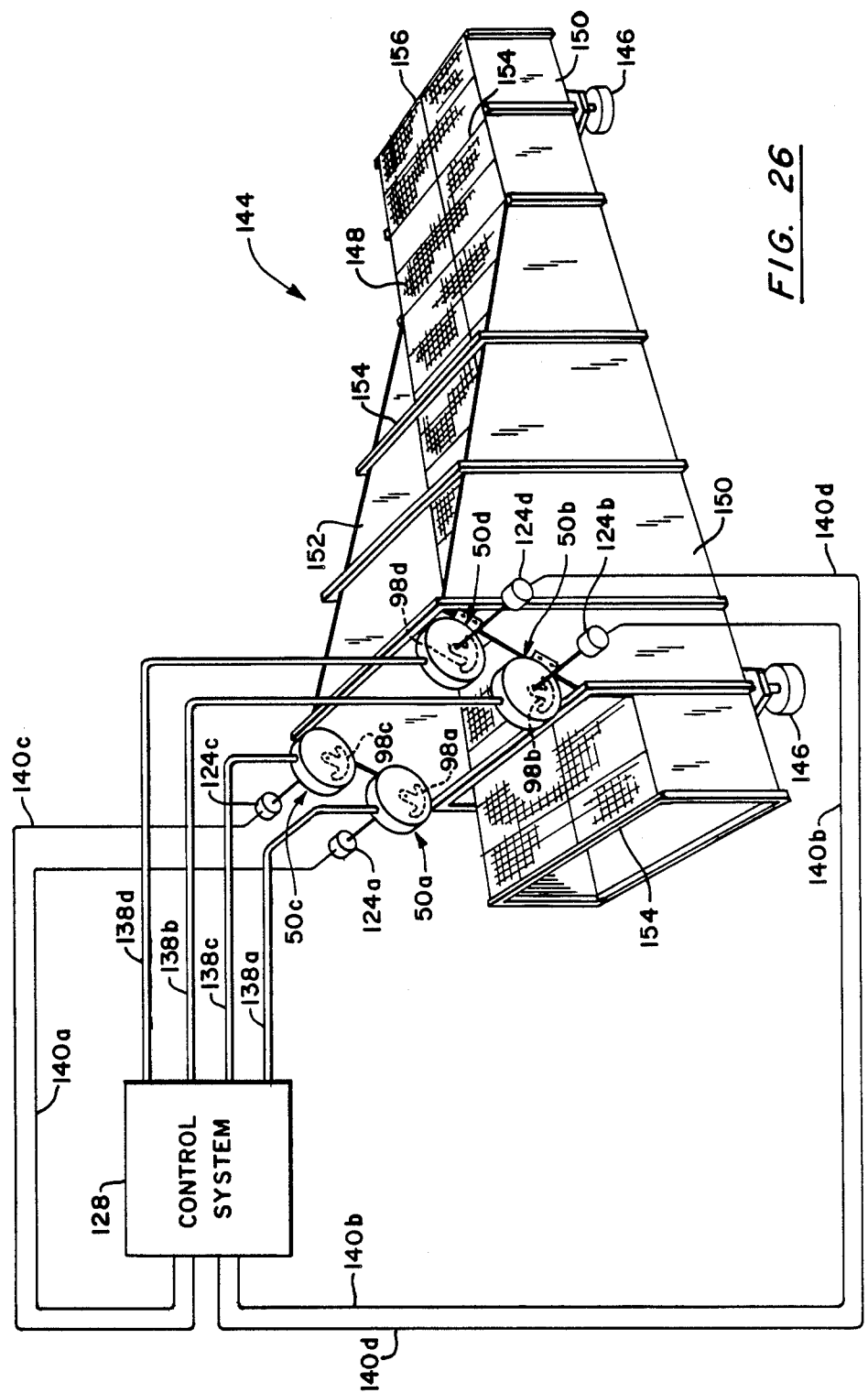
FIG. 26 illustrates the operation of four vibration generators employed vibrating a screen wherein the vibration energy is the net of the four vibration generators.

With reference to FIG. 26, the four vibration generators are designated a, b, c and d for convenience with the designating letter appended to the appropriate reference numeral when referring to a specific element as was done with reference to FIG. 25. Vibration generators 50*a* and 50*b* of FIG. 25 need not be identical to vibration generators 50*a* and 50*b* of FIG. 26. Nor is the axial orientation and net centrifugal force generated by vibration generators 50*a* and 50*b* of FIG. 25 necessarily identical to the axial orientation or the net centrifugal force of vibration generators 50*a* and 50*b* of FIG. 26.

Referring to FIG. 26, a screen apparatus 144 such as as used in a process to separate larger particles from smaller particles is shown supported from a floor by cushioned mounts 146 such as springs or rubber cylinders. Screening surface 148 spans between side plates 150 and 152. Cross members 154 also span between side plates 150 and 152 providing structure supporting side plates 152 and 154 as well as support for screening surface 148. The material to be screened is placed on screening surface 148 from above with the finer particles passing downward through screening surface 148 and the more coarse particles remaining on the upper surface of screening surface 148. Screening surface 148 may be sloped so that the more coarse particles gravitate towards end 156 passing thereover to reprocessing or disposal.

Vibration generators 50*a*, 50*b*, 50*c* and 50*d* are shown mounted on side plates 152 and 154. The net centrifugal force from the four vibration generators 50*a*, 50*b*, 50*c* and 50*d* provide the vibratory energy for the screening process. Vibration generators 50*a* and 50*c* are shown mounted on side plate 152. Vibration generators 50*b* and 50*d* are shown mounted on side plate 150.

Although many possible methods of operation of four vibration generators are contemplated within the scope of the invention, the simplest method is described below wherein vibration generators 50*a*, 50*b*, 50*c* and 50*d* provide vibration energy to screening apparatus 144 to vibrate screening apparatus 144 back and forth horizontally through a limited range. Vibration generators 50*a*, 50*b*, 50*c* and 50*d* can be any of the above-described embodiments of a vibration generator having a circumferentially arranged array of electromagnets with a horizontal axis, a magnetically attractable mass loosely disposed within and a control system common to all four vibration generators or synchronized to sequentially energize and deenergize in a predetermined sequence each electromagnet of each circumferentially arranged array of electromagnets, thereby establishing in each vibration generator an apparent rotating magnetic field which in turn causes the magnetically attractable mass to move in an orbiting manner around the axis of the array of the electromagnets generating a centrifugal force. The axes of the array of electromagnets of each vibration generator are parallel to elimlnate undesirable axial vectorial forces. Of course, there may be applications where such forces are desirable and therefore the axes of vibration generators 50a, 50b, 50c and 50d would not be parallel. Also, in the simplest embodiment the axes of the circumferentially arranged array of electromagnets of vibration generators 50a, 50b, 50c and 50d are planar with vibration generators 50a, 50b, 50c and 50d located at the four corners of a quadrangle. When the four vibration generators 50a, 50b, 50c and 50d are not planar, control system 128 can compensate by introducing a phase shift in the predetermined sequence of energizing then deenergizing the electromagnets of one or more vibration generators to generate the desired net centrifugal force.

Vibration generators 50a and 50b operate as a first pair of vibration generators. When the quadrangle arrangement of vibration generators 50a, 50b, 50c and 50d is a rectangle, the circumferential array of electromagnets of vibration generators 50a and 50b are coaxial. The more general term axially aligned will be used in reference to a pair of vibration generators such as 50a and 50b wherein it is understood that although the axes may be colinear, colinearity is not required.

The orbiting mass of two axially aligned vibration generators 50a and 50b are caused to orbit in a desired direction of rotation about the axis of the respective circumferentially spaced electromagnets in the above-described manner by sequentially energizing, then deenergizing in a predetermined sequence each electromagnet of the respective circumferentially arranged array of electromagnets. Either during initiating orbiting or subsequent to achieving orbiting the phase relationship between the orbiting mass of vibration generator 50a and the vibration generator 50b is reduced to zero by synchronizing the energizing and deenergizing of the electromagnets of vibration generators of 50a and 50b such that the orbiting masses orbit synchronously. The rate of orbiting of masses 98a and 98b is then accelerated to a desired rate of orbiting. The desired rate of orbiting masses 98a and 98b remains constant by maintaining constant the rate of energizing and deenergizing the electromagnets in the predetermined sequence of vibration generators 50a and 50b.

Vibration generators 50c and 50d are operated in a similar manner by initiating orbiting of masses 98c and 98d by sequentially energizing, then deenergizing in the predetermined sequence of vibration generators 50c and 50d each electromagnet of the respective circumferentially arranged array of electromagnets causing masses 98c and 98d to orbit in a desired direction of rotation. Either during initiating orbiting or subsequent to achieving orbiting, the phase relationship between masses 98c and 98d is reduced to zero by synchronizing the energizing and deenergizing of the electromagnets of vibration generators 50c and 50d such that masses 98c and 98d orbit synchronously. The rate of orbiting of masses 98c and 98d is increased to a desired rate of orbiting which may but is not required to be the same rate of orbiting as masses 98a and 98b.

In the preferred embodiment as employed in vibrating screening apparatus 144, the rate of orbiting of masses 98c and 98d are identical to the rate of orbiting of masses 98a and 98b. In addition to accelerating the rate of energizing then deenergizing electromagnets in the predetermined sequence of vibration generators 50c and 50d to achieve a desired rate of orbiting of masses 98c and 98d a desired phase relationship is established between the synchronously orbiting masses 98c and 98d of the second pair of vibration generators 50c and 50d and the synchronously orbiting masses 98a and 98b of the first pair of vibration generators 50a and 50b. After establishing these operating conditions, the rate of orbiting of masses 98c and 98d are maintaining constant by maintaining constant the rate of energizing and deenergizing the electromagnets of vibration generators 50c and 50d in the respective predetermined sequence thereof.

The net centrifugal force of vibration generators 50b and 50d provide vibratory energy to side plate 150. Similarly, the net centrifugal force of vibration generators 50a and 50c provide vibratory energy to side plate 152. The vibratory energy delivered to side plate 150 is identical to the vibratory energy delivered to side plate 152 to cause each side plate and hence screening surface 148 to move in unison. Other applications might require different forces applied to each side plate of screening apparatus 144.

Heretofore it has been necessary to provide eccentric weights in the location of vibration generators 50a, 50b, 50c and 50d. Two eccentric weights were typically mounted on a single shaft and driven by a single external source such as an electric motor. In this manner the eccentric weights mounted on each shaft were mechanically synchronized across the width of screening surface 148. Shaft deflection under its own weight, a function of the shaft length cubed, caused shaft failure even in shafts of large diameter where the size of the shaft was an attempt to increase its strength thereby reducing deflection and hence failure. This problem limited shaft length to approximately ten feet. As a result of limiting shaft length, the width of screening surface 148 has been in turn limited to approximately ten feet. According to the present invention, this undesirable limitation is eliminated in that the vectorial centrifugal force due to a vibration generator mounted on each side plate is electrically, not mechanically, synchronized.

Although in the prior art colinear eccentric weights mounted on opposite side plate of a screening apparatus 144 rotated in the same direction due to being coupled by a shaft, that constraint does not carry over to the present invention. Thus, vibration generators 50a and 50d may operate as a first pair of vibration generators as described above and vibration generators 50c and 50b may operate as a second pair of vibration generators.

The desired direction of rotation of the first pair of vibration generators may be the same as or the opposite of the desired direction of rotation of the second pair of vibration generators. Furthermore, the rate of orbiting in the first pair of vibration generators may be the same as or different from the rate of orbiting in the second pair of vibration generators. With the first pair of vibration generators orbiting in a clockwise direction of rotation and the second pair of vibration generators orbiting in a counterclockwise direction of rotation, and with the rate of orbiting the first pair of synchronized vibration generators identical to the rate of orbiting the second pair of vibration generators, screening surface 148 moves in a back and forth linear motion the angle of which is dependent upon the phase relationship between the centrifugal force generated by the first pair of vibration generators and that produced by the second pair of vibration generators.

When the phase relationship between the first pair of vibration generators and the second pair of vibration generators is 180°, screening surface 148 oscillates horizontally as in the preferred embodiment.

In a more general mode of operating vibration generators 50a, 50b, 50c and 50d, each of the four vibration generators operates at a different orbiting rate. Vibration generators 50b and 50d operate as a first pair with orbiting masses 98b and 98d thereof orbiting in the same or opposite directions. The rate of orbiting of mass 98d may be an integral or nonintegral multiple of the rate of orbiting of mass 98d. Vibration generators 50b and 50d produce a net vectorial force that is transmitted to side plate 150 to provide vibration energy thereto.

Vibration generators 50a and 50c operate as a second pair with orbiting masses 98a and 98c thereof orbiting in the same or opposite directions. The rate of orbiting of mass 98c may be an integral or nonintegral multiple of the rate of orbiting of mass 98a. The rate of orbiting of mass 98a may or may not have a relationship to the rate of orbiting of mass 98b such that each of masses 98a, 98b, 98c and 98d may be orbiting at different rates. Vibration generators 50a and 50c produce a net vectorial force that is transmitted to side plate 152 to provide vibration energy thereto.

In this more general mode of operating vibration generators 50a, 50b, 50c and 50d, the vibratory energy delivered to side plate 150 is not necessarily identical to the vibratory energy delivered to side plate 152. However, controlling the direction and rate of orbiting of masses 98a, 98b, 98c and 98d produces a predetermined, controllable vibration of side plates 150 and 152 and hence screening surface 148.

The method of inducing vibration employing four vibration generators as described above can be further enhanced by monitoring the position of the orbiting mass of each vibration generator 50a, 50b, 50c and 50d by angular position monitor 124a, 124b, 124c and 124d, respectively. A feedback control signal indicating the position of orbiting mass 98a, 98b, 98c and 98d is provided to control system 128 on feedback conductors 140a, 140b, 140c and 140d. In this manner control system 128 can provide control signals to vibration generators 50a, 50b, 50c and 50d on cables 138a, 138b, 138c and 138d to control the energizing then deenergizing of the electromagnets of the respective vibration generators in response to the monitored position of the respective orbiting mass 98a, 98b, 98c and 98d. Under some operating configurations, it may only be necessary to monitor the position of the orbiting mass of one of the first pair of vibration generators and the position of the orbiting mass of one of the second pair of vibration generators such as where a single control signal simultaneously is provided to the two vibration generators in the first pair of vibration generators and the second pair of vibration generators and the two vibration generators of each pair are identical.

While the present invention has been described and illustrated in the drawing with reference to embodiments wherein sixteen electromagnets form a circumferential array the invention is not limited thereto.

I claim:

1. A method for inducing vibration using two vibration generators mounted on apparatus being vibrated, the vibration generators of the type having a circumferentially arranged array of electromagnets having a horizontal axis, a magnetically attractable mass loosely disposed therein and in a common control system for sequentially energizing and deenergizing in a predetermined sequence each electromagnet of each circumferentially arranged array of electromagnets establishing an apparent rotating magnetic field which in turn causes the magnetically attractable mass to move circumferentially in an orbiting manner toward the energized electromagnet and around the axis of the array of electromagnets generating a centrifugal force such that the net centrifugal force of the two vibration generators induces vibration, comprising the steps of:

(a) sequentially energizing then deenergizing in a predetermined sequence each electromagnet of a circumferentially arranged array of electromagnets of a first vibration generator causing the magnetically attractable mass of the first vibration generator to orbit in a desired direction of rotation;

(b) accelerating the rate of energizing then deenergizing the electromagnets in the predetermined sequence of the first vibration generator to generate a desired rate of orbiting of the magnetically attractable mass of the first vibration generator;

(c) maintaining constant the rate of energizing then deenergizing the electromagnets in the predetermined sequence of the first vibration generator and hence the rate of orbiting of the magnetically attractable mass of the first vibration generator;

(d) sequentially energizing then deenergizing in a predetermined sequence each electromagnet of a circumferentially arranged array of electromagnets of a second vibration generator causing the magnetically attractable mass of the second vibration generator to orbit in a desired direction of rotation;

(e) accelerating the rate of energizing then deenergizing the electromagnets in the predetermined sequence of the second vibration generator to generate a desired rate of orbiting of the magnetically attractable mass of the second vibration generator; and (f) maintaining the rate of energizing then deenergizing the electromagnets in the predetermined sequence of the second vibration generator to maintain the desired rate of orbiting of the magnetically attractable mass of the second vibration generator thereby electrically controlling the rate of orbiting of the orbiting masses of the first and second vibration generators and hence the net vectorial force induced.

2. The method of inducing vibration as recited in claim 1 wherein the desired rate of orbiting of the magnetically attractable mass of the second vibration generator is an integral multiple of the desired rate of orbiting of the magnetically attractable mass of the first vibration generator.

3. The method of inducing vibration as recited in claim 1 wherein the desired direction of rotation of the magnetically attractable mass of the second vibration generator is the same as the desired direction of rotation of the magnetically attractable mass of the first vibration generator.

4. The method of inducing vibration as recited in claim 1 the desired direction of rotation of the magnetically attractable mass of the second vibration generator is opposite the desired direction of rotation of the magnetically attractable mass of the first vibration generator.

5. The method of inducing vibration as recited in claim 1 wherein maintaining constant the rate of energizing then deenergizing the electromagnets in the predetermined sequence of the first vibration generator results in an orbiting rate of the magnetically attractable mass of the first vibration generator that is the same as the orbiting rate of the magnetically attractable mass of the second vibration generator when the rate of energizing then deenergizing the electromagnets in the predetermined sequence of the second vibration generator is maintained constant.

6. A method for inducing vibration using two vibration generators mounted on apparatus being vibrated, the vibration generators of the type having a circumferentially arranged electromagnets having a horizontal axis, a magnetically attractable mass loosely disposed therein and a common control system for sequentially energizing and deenergizing in a predetermined sequence each electromagnet of each circumferentially arranged array of electromagnets establishing an apparent rotating magnetic field which in turn causes the magnetically attractable mass to move circumferentially in an orbiting manner toward the energized electromagnet and around the axis of the array of electromagnets generating a centrifugal force such that the net centrifugal force of the two vibration generators induces vibration, comprising the steps of:
   (a) sequentially energizing then deenergizing in a predetermined sequence each electromagnet of a circumferentially arranged array of electromagnets of a first vibration generator causing the magnetically attractable mass of the first vibration generator to orbit in a desired direction of rotation;
   (b) accelerating the rate of energizing then deenergizing the electromagnets in the predetermined sequence of the first vibration generator to generate a desired rate of orbiting of the magnetically attractable mass of the first vibration generator;
   (c) maintaining constant the rate of energizing then deenergizing the electromagnets in the predetermined sequence of the first vibration generator and hence the rate of orbiting of the magnetically attractable mass of the first vibration generator;
   (d) sequentially energizing then deenergizing in a predetermined sequence each electromagnet of a circumferentially arranged array of electromagnets of a second vibration generator causing the magnetically attractable mass of the second vibration generator to orbit in a desired direction of rotation;
   (e) accelerating the rate of energizing then deenergizing the electromagnets in the predetermined sequence of the second vibration generator to generate a desired rate of orbiting and a desired phase relationship between the orbiting magnetically attractable mass of the first vibration generator and the orbiting magnetically attractable mass of the second vibration generator; and
   (f) maintaining the rate of energizing then deenergizing the electromagnets in the predetermined sequence of the second vibration generator to maintain the desired rate of orbiting of the magnetically attractable mass of the second vibration generator and to maintain the phase relationship between the orbiting masses of the first and second vibration generators thereby electrically controlling the phase relationship between the orbiting masses of the first and second vibration generators and hence the net centrifugal force induced.

7. The method of inducing vibration as recited in claim 6 wherein the step of accelerating the rate of energizing then deenergizing the electromagnets in the predetermined sequence comprises:
   sequentially decreasing the duration that each electromagnet is energized in the predetermined sequence; and
   concurrently with decreasing the duration, increasing the current supplied to the energized electromagnet for the decreased duration.

8. The method of inducing vibration as recited in claim 6 wherein the desired direction of rotation of the first and second vibration generators are the same direction.

9. The method of inducing vibration as recited in claim 6 wherein the desired direction of rotation of the first and second vibration generators are the opposite directions.

10. The method of inducing vibration as recited in claim 6 wherein mantaining constant the rate of energizing then deenergizing the electromagnets in the predetermined sequence of the first vibration generator results in an orbiting rate of the magnetically attractable mass of the first vibration generator that is the same as the oribiting rate of the magnetically attractable mass of the second vibration generator when the rate of energizing then deenergizing the electromagnets in the predetermined sequence of the second vibration generator is maintained constant.

11. The method of inducing vibration as recited in claim 6 further comprising:
   (a) monitoring the position of the orbiting mass relative to the centerline of the energized electromagnet of the first vibration generator;
   (b) controlling the energizing then deenergizing of the electromagnets of the first vibration generator in response to the monitored position of the orbiting mass;
   (c) monitoring the position of the orbiting mass relative to the centerline of the energized electromagnet of the second vibration generator; and
   (d) controlling the energizing then deenergizing of the electromagnets of the second vibration generator in response to the monitored position of the orbiting mass.

12. A method of inducing vibration using four vibration generators of the type having a circumferentially arranged array of electromagnets the axes of which are horizontal and substantially in a plane with the four vibration generators mounted on apparatus being vibrated substantially at the corners of a quadrangle, a magnetically attractable mass loosely disposed therein and a common control system for sequentially energizing and deenergizing in a predetermined sequence each electromagnet of each circumferentially arranged array of electromagnets establishing an apparent rotating magnetic field which in turn causes the magnetically attractable mass to move circumferentially in an orbiting manner toward the energized electromagnet generating a centrifugal force such that the net centrifugal force of the four vibration generators induces vibration, comprising the steps of:
   (a) sequentially energizing then deenergizing in a predetermined sequence each electromagnet of a circumferentially arranged array of electromagnets of the first vibration generator causing the magnetically attractable mass thereof to orbit in a desired direction of rotation at a first rate;

(b) maintaining constant the rate of energizing then deenergizing the electromagnets in the predetermined sequence of the first vibration generator and hence the rate of orbiting of the magnetically attractable mass of the first vibration generator;

(c) sequentially energizing then deenergizing in a predetermined sequence each electromagnet of a circumferentially arranged array of electromagnets of the second vibration generator causing the magnetically attractable mass thereof to orbit in a desired direction of rotation at a second rate, the second rate of orbiting being a multiple of the first rate of orbiting;

(d) maintaining constant the rate of energizing then deenergizing the electromagnets in the predetermined sequence of the second vibration generator and hence the rate of orbiting of the magnetically attractable mass of the second vibration generator;

(e) sequentially energizing then deenergizing in a predetermined sequence each electromagnet of a circumferentially arranged array of electromagnets of the third vibration generator causing the magnetically attractable mass thereof to orbit in a desired direction of rotation at a third rate;

(f) maintaining constant the rate of energizing then deenergizing the electromagnets in the predetermined sequence of the third vibration generator and hence the rate of orbiting of the magnetically attractable mass of the third vibration generator;

(g) sequentially energizing then deenergizing in a predetermined sequence each electromagnet of a circumferentially arranged array of electromagnets of the fourth vibration generator causing the magnetically attractable mass thereof to orbit in a desired direction of rotation at a fourth rate, the fourth rate of orbiting being a multiple of the third rate of orbiting; and (h) maintaining constant the rate of energizing then deenergizing the electromagnets in the predetermined sequence of the fourth vibration generator and hence the rate of orbiting of the magnetically attractable mass of the fourth vibration generator, whereby the net vectorial force of the first and second vibration generators and the net vectorial force of the third and fourth vibration generators provide vibrato to the apparatus being vibrated.

13. The method of inducing vibration as recited in claim 12 wherein each of the four rates of orbiting are different.

14. A method of inducing vibration using four vibration generators of the type having a circumferentially arranged array of electromagnets the axes of which are horizontal and substantially in a plane with the four vibration generators located substantially at the corners of a quadrangle, a magnetically attractable mass loosely disposed therein and a common control system for sequentially energizing and deenergizing in a predetermined sequence each electromagnet of each circumferentially arranged array of electromagnets establishing an apparent rotating magnetic field which in turn causes the magnetically attractable mass to move circumferentially in an orbiting manner toward the energized electromagnet generating a centrifugal force such that the net centrifugal force of the four vibration generators induces vibration, comprising the steps of:

(a) sequentially energizing then deenergizing in a predetermined sequence each electromagnet of a circumferentially arranged array of electromagnets of two axially aligned vibration generators on adjacent quadrangle corners causing the magnetically attractable mass of a first pair of vibration generators to orbit in a desired direction of rotation;

(b) synchronizing the energizing and deenergizing of the electromagnets of the first pair of vibration generators such that the magnetically attractable masses of the first pair of vibration generators orbit synchronously;

(c) accelerating the rate of energizing then deenergizing the electromagnets in the predetermined sequence of the first pair of vibration generators to generate a desired rate of orbiting of the magnetically attractable masses of the first pair of vibration generators;

(d) maintaining constant the rate of energizing then deenergizing the electromagnets in the predetermined sequence of the first pair of vibration generators and hence the synchronized rate of orbiting of the magnetically attractable masses of the first pair of vibration generators;

(e) sequentially energizing then deenergizing in a predetermined sequence each electromagnet of a circumferentially arranged array of electromagnets of the remaining two axially aligned vibration generators on adjacent quadrangle corners causing the magnetically attractable mass of a second pair of vibration generators to orbit in a desired direction of rotation;

(f) synchronizing the energizing and deenergizing of the electromangets of the second pair of vibration generators such that the magnetically attractable masses of the second pair of vibration generators orbit synchronously;

(g) accelerating the rate of energizing then deenergizing the electromagnets in the predetermined sequence of the second pair of vibration generators to generate a desired rate of orbiting the magnetically attractable masses of the second pair of vibration generators and a desired phase relationship between the magnetically attractable masses of the second pair of vibration generators; and (h) maintaining constant the rate of energizing then deenergizing the electromagnets in the predetermined sequence of the second pair of vibration generators and hence the synchronized rate of orbiting of the magnetically attractable masses of the second pair of vibration generators.

15. The method of inducing vibration as recited in claim 14 the desired direction of rotation of the first pair of vibration generators is the same as the desired direction of rotation of the second pair of vibration generators.

16. The method of inducing vibration as recited in claim 14 wherein the desired direction of rotation of the first pair of vibration generators is opposite the desired direction of vibration of the second pair of vibration generators.

17. The method of inducing vibration as recited in claim 14 wherein maintaining constant the rate of energizing then deenergizing the electromagnets in the predetermined sequence of the first pair of vibration generators results in an orbiting rate of the magnetically attractable masses of the first pair of vibration generators that is the same as the orbiting rate of the magnetically attractable masses of the second pair of vibration generators when the rate of energizing then deenergizing the electromagnets in the predetermined sequence of the second pair of vibration generators is maintained constant.

18. The method of inducing vibration as recited in claim 14 further comprising:
(a) monitoring the position of the orbiting mass of one of the first pair of vibration generators;
(b) controlling the energizing then deenergizing of the electromagnets of the first pair of vibration generators in response to the respective monitored position of the orbiting mass;
(c) monitoring the position of the orbiting mass of one of the second pair of vibration generators; and
(d) controlling the energizing then deenergizing of the electromagnets of the second pair of vibration generators in response to the respective monitored position of the orbiting mass.

19. The method of inducing vibration as recited in claim 14 wherein the step of accelerating the rate of energizing then deenergizing the electromagnets in the predetermined sequence comprises:
sequentially decreasing the duration that an electromagnet is energized in the predetermined sequence; and
concurrently with decreasing the duration, increasing the current supplied to the energized electromagnet for the decreased duration.

* * * * *

UNITED STATES PATENT AND TRADEMARK OFFICE
CERTIFICATE OF CORRECTION

PATENT NO. : 4,774,440
DATED : September 27, 1988
INVENTOR(S) : Krishna Bhadra

It is certified that error appears in the above—identified patent and that said Letters Patent is hereby corrected as shown below:

Title page:

Assignee should be --W. S. Tyler, Incorporated-- not "Combustion Engineering, Inc.".

Column 8, line 2, "fricion" should be --friction--.

Column 11, line 28, "emperically" should be --empirically--.

Column 17, line 34, --maintain-- should be inserted between "to" and "the".

Column 18, line 14, "invehtion" should be --invention--.

Column 18, line 15, "10B" should be --108--.

Signed and Sealed this

Fifth Day of September, 1989

Attest:

DONALD J. QUIGG

Attesting Officer

Commissioner of Patents and Trademarks